US012479900B2

(12) United States Patent
Zhang

(10) Patent No.: US 12,479,900 B2
(45) Date of Patent: Nov. 25, 2025

(54) FUSION PROTEIN AND COMPOSITION FOR TREATING ANIMAL TUMORS

(71) Applicant: Ningbo Innovative Mechanism Bioscience LLC, Ningbo (CN)

(72) Inventor: Jinyu Zhang, Beijing (CN)

(73) Assignee: Ningbo Innovative Mechanism Bioscience LLC (CN)

(*) Notice: Subject to any disclaimer, the term of this patent is extended or adjusted under 35 U.S.C. 154(b) by 794 days.

(21) Appl. No.: 17/625,131

(22) PCT Filed: Jun. 22, 2020

(86) PCT No.: PCT/CN2020/097441
§ 371 (c)(1),
(2) Date: Jan. 6, 2022

(87) PCT Pub. No.: WO2021/008308
PCT Pub. Date: Jan. 21, 2021

(65) Prior Publication Data
US 2022/0267399 A1 Aug. 25, 2022

(30) Foreign Application Priority Data
Jul. 12, 2019 (CN) .......................... 201910627990.4

(51) Int. Cl.
| *A61K 38/19* | (2006.01) |
| *A61P 35/00* | (2006.01) |
| *C07K 14/535* | (2006.01) |
| *C07K 14/54* | (2006.01) |
| *C07K 14/55* | (2006.01) |

(52) U.S. Cl.
CPC .............. *C07K 14/55* (2013.01); *A61P 35/00* (2018.01); *C07K 14/535* (2013.01); *C07K 14/5434* (2013.01)

(58) Field of Classification Search
None
See application file for complete search history.

(56) References Cited

U.S. PATENT DOCUMENTS

| 5,091,513 | A | * | 2/1992 | Huston | ................... | C12N 15/62 |
| | | | | | | 435/69.6 |
| 6,617,135 | B1 | | 9/2003 | Gillies et al. | | |
| 11,535,656 | B2 | * | 12/2022 | Zhang | ..................... | C07K 14/54 |
| 11,795,203 | B2 | * | 10/2023 | Zhang | ..................... | A61P 35/00 |
| 2007/0178066 | A1 | | 8/2007 | Hall et al. | | |
| 2007/0258944 | A1 | | 11/2007 | Gillies et al. | | |
| 2020/0199189 | A1 | | 6/2020 | Zhang | | |
| 2020/0317787 | A1 | | 10/2020 | Li et al. | | |
| 2020/0338166 | A1 | * | 10/2020 | Zhang | ..................... | A61P 35/02 |
| 2022/0211803 | A1 | * | 7/2022 | Zhang | ..................... | A61P 35/00 |
| 2022/0213160 | A1 | * | 7/2022 | Zhang | ..................... | C07K 14/55 |
| 2023/0043257 | A1 | * | 2/2023 | Zhang | ..................... | C07K 14/535 |
| 2023/0203118 | A1 | * | 6/2023 | Zhang | ..................... | A61P 35/04 |
| | | | | | | 424/85.2 |

FOREIGN PATENT DOCUMENTS

| CN | 101495156 | A | 7/2009 |
| EP | 1731531 | A2 | 12/2006 |
| EP | 3607965 | A1 | 2/2020 |
| EP | 3964531 | A1 | 3/2022 |
| EP | 3964533 | A1 | 3/2022 |
| JP | 2003507012 | A | 2/2003 |
| JP | 2022530153 | A | 6/2022 |
| WO | 96/24676 | A1 | 8/1996 |
| WO | 2018184484 | A1 | 10/2018 |
| WO | 2019129053 | A1 | 7/2019 |
| WO | 2021/018026 | A1 | 2/2021 |
| WO | 2021/147886 | A1 | 7/2021 |

OTHER PUBLICATIONS

NCBI sequence for the equine herpesvirus 1 major capsid protein (accession VCBED6)(1999).*
NCBI entry for IL12 (accession NP 002178)(2024).*
NCBI entry for IL2 (accession P60568)(2024).*
NCBI entry for GMCSF (accession NP 000749)(2024).*
Reif, John S. et al., "Passive smoking and canine lung cancer risk." Am. J. Epidemiol. (1992) 135(3) p. 234-239.*
Aslantas, Yaprak et al, "Effects of n-terminal and c-terminal polyhistidine tag on the stability and function of the thermophilic p450 cyp119." Bioinorg. Chem. Appl. (Jun. 2019) ID 8080697.*
Search Report dated Jun. 12, 2022 from the Office Action for Chinese Application No. 201910627990.4 issued Jun. 16, 2022, 2 pages.
Du, X. et al., "The therapeutic effects of intratumoral injection of IL 12IL2GMCSF fusion protein on canine tumors," BioRxiv, Jun. 2020, pp. 1-19.
International Search Report for Application No. PCT/CN2020/097441 mailed Sep. 25, 2020, pp. 1-7.
Ortiz-Sanchez, E. et al., "Antibody-cytokine fusion proteins: applications in cancer therapy," Expert Opin Biol Ther, May 2008, pp. 609-632, vol. 8, No. 5, HHS Public Access.
Strauss, J. et al., "First-in-Human Phase I Trial of a Tumor-Targeted Cytokine (NHS-IL 12) in Subjects with Metastatic Solid Tumors," Clinical Cancer Research, Aug. 2018, pp. 99-109.
Wen, Q. et al., "Fusion cytokine IL-2-GMCSF enhances anticancer immune responses through promoting cell-cell interactions," Journal of Translational Medicine, Dec. 2016, pp. 1-13, vol. 14.
Williams, P. et al., "GM-CSF-Based Fusion Cytokines as Ligands for Immune Modulation" The Journal of Immunology, Dec. 2011, pp. 5527-5532, vol. 186.

(Continued)

*Primary Examiner* — Fred H Reynolds
(74) *Attorney, Agent, or Firm* — Lerner David LLP

(57) ABSTRACT

A fusion protein and composition for treating animal tumors. The fusion protein comprises three different gene segments. The fusion protein has a good inhibitory effect on various animal solid tumors, and is capable of shrinking tumors, or even causing same to disappear; is capable of better inhibiting the metastasis of malignant tumors; and improves the quality of life of patients to a large extent.

15 Claims, 2 Drawing Sheets
Specification includes a Sequence Listing.

(56) References Cited

OTHER PUBLICATIONS

Zhang, J. et al., "In situ administration of cytokine combinations induces tumor regression in mice," EBio Medicine, Oct. 2018, pp. 38-46, vol. 37, Elsevier.

Zhaoyan, K. et al., "The application of cytokines in the treatment of tumors," Journal of Modern Oncology, Apr. 2014, pp. 971-974, vol. 22, No. 4. (Providing English Translation of Abstract only).

Extended European Search Report for Application No. 20841149.6 mailed May 7, 2023. 12 pgs.

Ortiz-Sanchez E et al: "Antibody-cytokine 1-14 fusion proteins: applications in cancer therapy", Expert Opin. Biol. Ther, vol. 8, No. 5, Aug. 13, 2015 (Aug. 13, 2015), pp. 609-632, XP002782442.

Walter C. Jean et al: "Effects of Combined Granulocyte-Macrophage Colony-Stimulating Factor (GM-CSF), Interleukin-2, and Interleukin-12 based Immunotherapy against Intracranial Glioma in the Rat", Journal of Neuro-Oncology, vol. 66, No. 1/2, Jan. 1, 2004 (Jan. 1, 2004), pp. 39-49, XP055757235.

Klefer, J. D. et al., "Immunocytokines and bispecific antibodies; two complementary strategies for the selective activation of immune cells at the tumor site," Immunol. Rev., Dec. 13, 2016; 270(1): pp. 178-192.

Milling, L. et al., "Delivering safer immunotherapies for cancer," Adv. Drug Deliv. Rev., May 2017; 114: pp. 79-101.

Smith, S. G. et al., "Intravesical chitosan/interleukin-12 immunotherapy induces tumor-specific systemic immunity against murine bladder cancer," Cancer Immunol Immunother, Jun. 2015; 64(6): pp. 689-696.

Ln Vo, J. et al., " Neoadjuvant immunotherapy with chitosan and interleukin-12 to control breast cancer metastasis," Oncoimmunology, Nov. 2014; 3(12): pp. e968001-1-e968001-10.

Yang, L. et al., "Role of chitosan co-formulation in enhancing interleukin-12 delivery and antitumor activity," Biomaterials, May 2013; 34(15): pp. 3828-3836.

Y. Bai, et al., Recombinant granulocyte colony-stimulating factor-transferrin fusion protein as an oral myelopoietic agent, Proc. Natl. Acad. Sci. U.S.A. 102 (20) 7292-7296, https://doi.org/10.1073/pnas.0500062102 (May 2005).

* cited by examiner

FUSION PROTEIN AND COMPOSITION FOR TREATING ANIMAL TUMORS

CROSS REFERENCE TO RELATED APPLICATIONS

The present application is a national phase entry under 35 U.S.C. § 371 of International Application No. PCT/CN2020/097441, filed Jun. 22, 2020, which claims priority from Chinese Patent Application No. 201910627990.4, filed Jul. 12, 2019, the disclosures of which are incorporated by reference herein.

TECHNICAL FIELD

The present invention relates to the technical field of anti-tumor drugs, in particular to a fusion protein and a composition for treating animal tumors.

BACKGROUND ART

Tumor is a new organism formed by the clonal abnormal proliferation of a certain cell in a local tissue that has lost the normal regulation of its growth at the gene level under the action of various carcinogenic factors. These new organisms are mostly space-occupying massive protrusions, so they are also called neoplasms.

In recent years, many new methods for treating tumors have appeared. At present, common and effective treatment methods include radiotherapy, chemotherapy, surgery, immunotherapy, and so on. However, there are still some problems, such as serious adverse reactions of radiotherapy and chemotherapy, high risk of surgery, and poor effect of immunotherapy on solid tumors.

In the pending Chinese patent application No. CN201810104146.9 previously filed by the applicant, an anti-tumor drug composition is disclosed, which comprises proteins IL12, GMCSF and IL2, wherein the mass ratio of IL12 protein: GMCSF protein: IL2 protein is 0.1-10:0.1-10: 0.1-10. The composition in the application plays a very good role in disease state control for a variety of solid tumor patients, and some patients can even achieve complete remission. During the treatment, the patient's body is less irritated and the adverse reactions are mild, and thus the patient's quality of life is greatly improved. However, since the composition of three proteins is used in the application, in practical application, it is necessary to prepare the components one by one, and then mix them in proportion. Consequently, there are problems such as complex preparation process, difficult quality control, and high cost.

Therefore, there is a need in the art for a single-component anti-tumor protein drug capable of better controlling or even completely alleviating the disease states of solid tumors, so as to reduce the preparation processes, improve quality control and reduce drug costs while achieving good curative effects.

SUMMARY OF THE INVENTION

In view of the shortcomings in the prior art, one objective of the present invention is to provide a fusion protein capable of treating animal tumors with low cost, high efficiency and simplicity.

The above objective is achieved by the following solutions:

In one aspect, the present invention provides a fusion protein for treating animal tumors, wherein the fusion protein comprises IL12, IL2 and GMCSF peptide fragments. In the amino acid sequence of the fusion protein, the order of connections among the peptide fragments is changeable, such as IL12, and GMCSF, or IL2, IL12 and GMCSF, or IL12, GMCSF and IL2. The three peptide fragments can be directly linked, or linked with common linkers in the art. For example, the linker can be a flexible linking segment, such as GSGGSG, GSGGSGG, GSGGSGGG, GGGGSGGG, etc. In a preferred embodiment, the fusion protein comprises an amino acid sequence formed by linking IL12, IL2 and GMCSF peptide fragments obtained from felines or canines. In another preferred embodiment, the fusion protein comprises an amino acid sequence formed by linking IL12, GMCSF and IL2 peptide fragments obtained from felines or canines. In some embodiments, the IL12 peptide fragment consists of two subunits, IL12a and IL12b. In an embodiment, the IL12, IL2 and GMCSF peptide fragments are obtained from felines or canines.

Through the technical solution, a fusion protein that has a good inhibitory effect on various animal solid tumors can be obtained, and the fusion protein is capable of shrinking tumors, or even causing same to disappear; is capable of better inhibiting the metastasis of malignant tumors; and improves the quality of life of patients to a large extent.

In the first aspect, further preferably, the IL2 and GMCSF peptide fragments are linked with DiaNHS76F8 peptide fragment. For example, in some specific embodiments, the fusion protein is: cIL12bIL12aIL2GMCSF (ID SEQ NO: 1), cIL12bIL12aGMCSFIL2 (ID SEQ NO: 2), fIL12bIL12aIL2GMCSF (ID SEQ NO: 3), fIL12bIL12aGMCSFIL2 (ID SEQ NO: 4), cIL12bIL12aIL2DiaNHS76F8GMCSF (ID SEQ NO: 5) or fIL12bIL12aIL2DiaNHS76F8GMCSF (ID SEQ NO: 6).

The DiaNHS76F8 peptide fragment has a capability of enhancing tumor targeting. Through the technical solution, the tumor targeting effect of the fusion protein can be further enhanced.

Further preferably, the tumor includes one or more selected from the group consisting of melanoma, kidney cancer, prostate cancer, breast cancer, colon cancer, lung cancer, liver cancer, bone cancer, pancreas cancer, skin cancer, head or neck cancer, oral cancer, nasopharynx cancer, malignant melanoma of skin or eye, uterine cancer, ovarian cancer, rectum cancer, anus cancer, stomach cancer, testicle cancer, uterus cancer, fallopian tube cancer, endometrium cancer, uterine cervix cancer, vagina cancer, vulva cancer, Hodgkin's disease, non-Hodgkin's lymphoma, esophagus cancer, small intestine cancer, thyroid cancer, parathyroid cancer, adrenal cancer, soft tissue sarcoma, urethra cancer, penis cancer, acute myeloid leukemia, chronic myeloid leukemia, acute lymphoblastic leukemia, chronic lymphocytic leukemia, lymphocytic lymphoma, bladder cancer, kidney or ureter cancer, renal pelvis cancer, central nervous system neoplasm, primary central nervous system lymphoma, tumor angiogenesis, spinal axis tumor, brainstem glioma, pituitary adenoma, Kaposi's sarcoma, epidermoid cancer, squamous cell cancer, T cell lymphoma, trunk sarcoma and basal cell tumor. In some preferred embodiments, the tumors are trunk sarcoma, basal cell tumor and breast cancer.

In a second aspect, there is provided a composition for treating animal tumors, wherein the composition comprises the fusion protein according to the aforementioned first aspect and a chitosan solution. Preferably, the composition comprises from 30 vol %, to 70 vol % of fusion protein solution and from 70 vol % to 30 vol % of chitosan solution. Further preferably, the composition comprises from 40 vol %, to 60 vol % of fusion protein solution and from 60 vol % to 40 vol % of chitosan solution. Further preferably, the composition comprises 50 vol % of fusion protein solution and 50 vol % of chitosan solution.

Through the technical solution, a composition that can be directly injected into animal tumors for treatment can be obtained. Without being bound by any theory, in the composition, chitosan mainly acts as a thickener, which increases the viscosity of the solution while slowing down the release rate of the fusion protein, thereby prolonging the effective acting time of the fusion protein as the main therapeutic component.

Further preferably, the chitosan solution is a solution containing from 1 wt % to 10 wt % of chitosan, further preferably a solution containing from 2 wt % to 9 wt % of chitosan, and further preferably a solution containing from 3 wt % to 8 wt % of chitosan. In a specific embodiment, in the chitosan solution, the content of the chitosan can be 1 wt %, 2 wt %, 3 wt %, 4 wt %, 5 wt %, 6 wt %, 7 wt %, 8 wt %, 9 wt %, 10 wt % or any range or any value therebetween, including but not limited to integral values or decimal values.

By adjusting the content range of chitosan, the viscosity of the composition and the release rate of the fusion protein can be adjusted, so that targeted treatment can be carried out.

Further preferably, the fusion protein solution is from 40 vol % to 60 vol % and the chitosan solution is from 70 vol % to 30 vol %, and more preferably, the fusion protein solution is 50 vol % and the chitosan solution is 50 vol %. In some embodiments, in the composition, the fusion protein solution can be 30 vol %, 31 vol %, 32 vol %, 33 vol %, 34 vol %, 35 vol %, 36 vol %, 37 vol %, 38 vol %, 39 vol %, 40 vol %, 41 vol %, 42 vol %, 43 vol %, 44 vol %, 45 vol %, 46 vol %, 47 vol %, 48 vol %, 49 vol %, 50 vol %, 51 vol %, 52 vol %, 53 vol %, 54 vol %, 55 vol %, 56 vol %, 57 vol %, 58 vol %, 59 vol %, 60 vol %, 61 vol %, 62 vol %, 62 vol %, 64 vol %, 65 vol %, 66 vol %, 67 vol %, 68 vol %, 69 vol %, 70 vol %, or any range or any value therebetween. The chitosan solution can be 30 vol %, 31 vol %, 32 vol %, 33 vol %, 34 vol %, 35 vol %, 36 vol %, 37 vol %, 38 vol %, 39 vol %, 40 vol %, 41 vol %, 42 vol %, 43 vol %, 44 vol %, 45 vol %, 46 vol %, 47 vol %, 48 vol %, 49 vol %, 50 vol %, 51 vol %, 52 vol %, 53 vol %, 54 vol %, 55 vol %, 56 vol %, 57 vol %, 58 vol %, 59 vol %, 60 vol %, 61 vol %, 62 vol %, 62 vol %, 64 vol %, 65 vol %, 66 vol %, 67 vol %, 68 vol %, 69 vol %, 70 vol %, or any range or any value therebetween.

By adjusting the relative volume ratio of the fusion protein solution to the chitosan solution, the viscosity of the composition and the release rate of the fusion protein can be adjusted, so that targeted treatment can be carried out.

Through the above technical solutions, the present invention obtains the following beneficial effects:

1) the fusion protein according to the present invention is a single protein, and its components have a very good synergistic effect; while enhancing the effects of each other, they also fully inhibit their respective toxic and side effects;
2) the preparation process is simple, the process quality is easy to control, and advantage in price and cost is achieved;
3) when the fusion protein according to the present invention is used for treating various tumors, the main components are prepared into a drug solution and then directly injected into the tumors, which has a strong targeting effect and has slight or even no adverse reactions;
4) the fusion protein has a good inhibitory effect on various solid tumors, and is capable of shrinking tumors, or even causing same to disappear; is capable of better inhibiting the metastasis of malignant tumors; and improves the quality of life of patients to a large extent.

DESCRIPTION OF THE DRAWINGS

Some preferred embodiments of the present invention will be described in detail hereinafter with reference to the accompanying drawings. Those of ordinary skill in the art will understand that these accompanying drawings are for illustrative purpose only and are not intended to limit the scope of the present invention in any way.

DETAILED DESCRIPTION OF THE INVENTION

Figure 1:
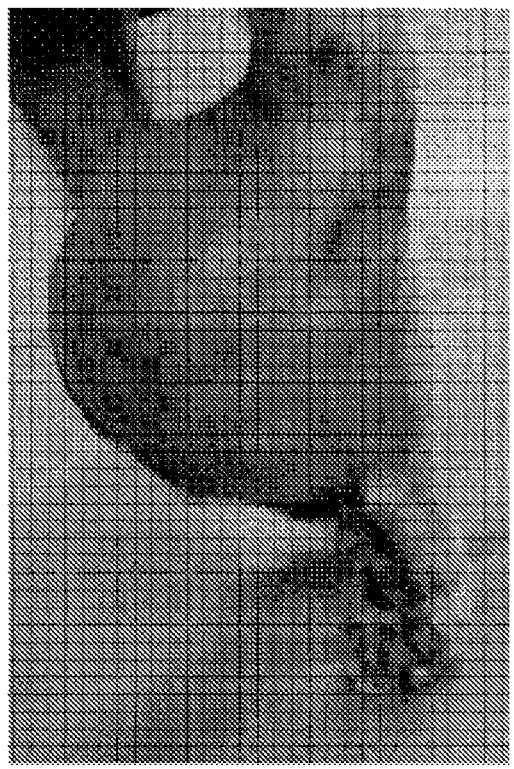
FIG. 1 is a photograph of a canine right foreleg sarcoma before administration according to the treatment of Example 10 of the present invention.

Some specific embodiments of the present invention will be described hereinafter with reference to the accompanying drawings and the examples. Those of ordinary skill in the art will understand that these examples are provided only to illustrate how the solutions of the present invention can be implemented, and not to limit the scope of the present invention in any way.

In one embodiment, the present invention provides a fusion protein for treating animal tumors, wherein the fusion protein comprises IL12, IL2 and GMCSF peptide fragments.

In the fusion protein, IL 12 is interleukin-12 (IL-12), which is a cytokine with a wide range of biological activities and is mainly produced by activated inflammatory cells. The coding region of the IL12 comprises two subunits, IL12a and IL12b, which can be linked with a T2A sequence. IL12 is a cytokine responsible for regulating T cells in the immune system and produced by activated T cells, which plays an important role in immune response, anti-virus infection, and the like of a body. At present, IL12 has been approved for the treatment of certain cancers, including metastatic melanoma and renal cell carcinoma. However, at present, there are some shortcomings in the application of IL12 alone: IL12 may cause general symptoms such as fever, vomiting, and the like, and may also lead to disorders of water and salt metabolism and abnormal functions of kidney, liver, heart, lung, and the like; and the most common and serious consequence is capillary leakage syndrome, which makes patients have to suspend treatment. Therefore, combined administration is usually needed to alleviate adverse reactions.

In the fusion protein, IL2 is interleukin-2. IL2 has a relatively strong anti-tumor activity (stronger than IL12) and relatively slight side effects. However, in a large number of experiments conducted by the inventor, there are still many problems when the IL2 is used alone. For example, IL2 is dose-dependent, and a relatively high dose of IL2 is required in the course of treatment, which leads to a high cost and is easy to cause anemia, thrombocytopenia, and the like.

In the fusion protein, GMCSF is granulocyte-macrophage colony stimulating factor, which stimulates proliferation and differentiation of myeloid stem cells to mature granulocytes, and can promote differentiation of myeloid stem cells to common progenitor cells of granulocytes (including neutrophile granulocytes and eosinophilic granulocytes), erythroid cells, megakaryocytes, myelomonocytes and monocytes, and promote proliferation and maturation of hematopoietic stem cells of the above series. However, the defects lie in a non-obvious effect on basophilic granulocytes and a little effect on erythroid advanced hematopoietic cells.

For the above reasons, the applicant tried to combine various cytokines to reduce the toxic and side effects while utilizing the effective synergistic effect. Through a lot of screening work, the inventor finally found that combining the above three cytokines, i.e. IL12, IL2 and GMCSF can achieve very significant tumor treatment effects while avoiding their respective shortcomings. Although the current mechanism is still unclear, the inventor has observed that there is a very good synergistic effect among IL12, IL2 and GMCSF, which is manifested in that the combination stimulates the immune system of diseased animals to recognize and kill tumor cells, so as to inhibit malignant tumors, and thus shrink tumors, or even cause same to disappear, and at the same time, almost no side effects are observed.

On the basis of this discovery, the inventor completed the contents of the pending application (Chinese Patent Application No. CN201810104146.9) previously filed by the applicant. In addition, the inventor also realized that when IL12, IL2 and GMCSF were prepared into a composition, it was necessary to prepare cells separately, and culture them to obtain their respective proteins and finally mix the proteins. This brought about the problems of complex preparation process, difficult control of process quality and high cost. On this basis, the inventor proposed that IL2, IL2 and GMCSF were prepared into a fusion protein to solve these problems. The present invention is made based on the discovery.

The preferred embodiments of the present invention are further described in detail hereinafter with reference to the specific embodiments. Those of ordinary skill in the art will understand that these illustrative examples are for illustrative purpose only and are not intended to limit the present invention in any way.

EXAMPLES

Reagents: DMEM medium, 1640 medium and fetal bovine serum were purchased from Life Technologies; CDM4HEK293 serum-free medium was purchased from Thermo; cell culture flasks and culture plates were purchased from Corning; Puromycin was purchased from Chemicon; restriction enzymes were purchased from Takara and NEB; ligase was purchased from NEB; DNA polymerase was purchased from Takara; plasmid extraction kit and gel recovery kit were purchased from Omega Biotech; primer synthesis was completed by Salmon Biotech (Shanghai) Co., Ltd.; and gene synthesis and sequencing were completed by Life Technologies. IL12 and IL2 ELISA kits were purchased from Thermo; GMCSF ELISA kit was purchased from Sigma; and chitosan (Protosan G 213) was purchased from NovaMatrix. Recombinant canine IL12, GMCSF and IL2 proteins and recombinant feline IL12, GMCSF and IL2 proteins were purchased from Novus Biologicals.

Example 1: Construction of IL12-Expressing Cells

The coding region of the canine IL12 gene was synthesized and contained two subunits, IL12a (Genbank Accession No.: NM_001003293) and IL12b (Genbank Accession No.: NM_001003292), which were linked with a T2A sequence. The synthesized gene had BamHI and XhoI restriction sites at the two ends respectively, and then was digested with BamHI and XhoI enzymes. The system was as follows: 5 μg of IL12 plasmid, 4 μL of enzyme digestion buffer, 1 μL of BamHI, 1 μL of XhoI, supplemented with water to a final volume of 40 μL. The mixture was stood at 37° C. for 12 hours. The EP tube was taken out, and 4.4 μL of 1.0× loading buffer was added, and then the resulting mixture was subjected to 1% agarose gel electrophoresis. After the electrophoresis, the IL12 gene segment was recovered for later use.

Expression vector pLentis-CMV-MCS-IBES-PURO was digested. The system was as follows: 2 μg of plasmid, 3 μL of enzyme digestion buffer, 1 μL of BamHI, 1 μL of XhoI, supplemented with water to a final volume of 30 μL. The mixture was stood at 37° C. for 12 hours. The EP tube was taken out, 3.3 μL of 10× loading buffer was added, and then the resulting mixture was subjected to 1% agarose gel electrophoresis. After the electrophoresis, the vector segment was recovered for later use.

The pLentis-CMV-MCS-IRES-PURO was ligated with IL12. The system was as follows: 2 μL, of pLentis-CMV-MCS-IRES-PURO, 2 μL of IL12, 1 μL, of ligase buffer, 0.5 μL of T4 DNA ligase, and 4.5 μL of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, and then the correct vector was sent for sequencing, and it was confirmed that the construction was successful. The expression vector was pLentis-CMV-IL12-PGK-PURO.

A virus containing the regulatory vector was prepared, and the method was as follows: 1. cultured 293FT cells were digested, after counting, 3×10⁶ cells/well were spread onto a 10-cm culture dish, and the volume of the culture solution was 10 ml; 2. on the next night, the cell status was observed and if the cell status was good, the cells could be transfected; chloroquine was added to the culture plate to a final concentration of 25 μm, one test tube was taken and added with sterilized water and the following plasmids (5 μg of pMD2.G+15 μg of pSPAX2+20 μg of pLentis-CMV-IL12-PGK-PURO) with a total volume of 1045 μL, then added with 155 μL of 2M CaCl$_2$, mixed evenly, and finally added with 1200 of 2×HBS; the test tube was oscillated while dropwise adding these components; after dropwise adding was completed, the mixture was quickly added into the cell culture wells, and shaken gently and mixed evenly; 3. on the third morning, the cell status was observed, and the medium was replaced by 10 ml of fresh DMEM medium; 4. on the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was adsorbed with absorbent paper as much as possible, and then the precipitate was re-suspended with 500 μL of HBSS, dissolved for 2 hours, then packed into small tubes, and stored at −70° C.

The 293 cells were transfected with the virus by the following method: the cultured 293 cells were digested, and seeded in a 6-well plate at a concentration of 10⁵ cells/well, with a culture volume of 1 ml; after 24 hours, 10 μL of the virus containing the regulatory vector was added, and the culture was continued in an incubator for an additional 24 hours, then the supernatant was discarded, and the medium was replaced by a fresh medium to continue the culture; after the cells were full, they were transferred out to a culture flask, and puromycin at a concentration suitable for the cells was added to continue the culture, the medium was replaced every two days, and the concentration of the puromycin was kept at 3 μg/ml; after screening for one week, the surviving cells were the cells stably expressing the regulatory protein, and named 293 (IL12).

Example 2: Construction of GMCSF-Expressing Cells

The coding region of the canine GMCSF (Genbank Accession No.: NM_001003245) gene was synthesized. The synthesized gene had BamHI and XhoI restriction sites at the two ends respectively, and then was digested with BamHI and XhoI enzymes. The system was as follows: 5 μg of GMCSF plasmid, 4 μL of enzyme digestion buffer, 1 μL of BamHI, 1 μL of XhoI, supplemented with water to a final volume of 40 μL. The mixture was stood at 37° C. for 12 hours. The EP tube was taken out, and 4.4 μL of 10× loading buffer was added, and then the resulting mixture was subjected to 1% agarose gel electrophoresis. After the electrophoresis, the GMCSF gene segment was recovered for later use.

Expression vector pLentis-CMV-MCS-IRES-PURO was digested. The system was as follows: 2 μg of plasmid, 3 μL of enzyme digestion buffer, 1 μL of BamHI, 1 μL of XhoI, supplemented with water to a al volume of 30 μL. The mixture was stood at 37° C. for 12 hours. The EP tube was taken out, 3.3 μL of 10× loading buffer was added, and then the resulting mixture was subjected to 1% agarose gel electrophoresis. After electrophoresis, the vector segment was recovered for later use.

The pLentis-CMV-MCS-IRES-PURO was ligated with GMCSF. The system was as follows: 2 μL, of pLentis-CMV-MCS-IRES-PURO, 2 μL of GMCSF, 1 μL of ligase buffer, 0.5 of T4 DNA ligase, and 4.5 μL of water. The mixture was placed at room temperature to ligate for 4 hours. Then, the ligation system was transformed into competent *Escherichia coli*. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, and then the correct vector was sent for sequencing, and it was confirmed that the construction was successful. The expression vector was pLentis-CMV-GMCSF-PGK-PURO.

A virus containing the regulatory vector was prepared, and the method was as follows: 1. cultured 293FT cells were digested, after counting, 3×106 cells/well were spread onto a 10-cm culture dish, and the volume of the culture solution was 10 ml; 2. on the next night, the cell status was observed and if the cell status was good, the cells could be transfected; chloroquine was added to the culture plate to a final concentration of 25 μm, one test tube was taken and added with sterilized water and the following plasmids (5 μg of pMD2.G+15 μg of pSPAX2+20 μg of pLentis-CMV-GMCSF-PGK-PURO) with a total volume of 1045 μL then added with 155 μL of 2M CaCl₂, mixed evenly, and finally added with 1200 μL of 2×HBS; the test tube was oscillated while dropwise adding these components; after dropwise adding was completed, the mixture was quickly added into the cell culture wells, and shaken gently and mixed evenly; 3. on the third morning, the cell status was observed, and the medium was replaced by 10 ml of fresh DMEM medium; 4. on the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was absorbed with absorbent paper as much as possible, and then the precipitate was re-suspended with 500 μL of HBSS, dissolved for 2 hours, then packed into small tubes, and stored at −70° C.

The 293 cells were transfected with the virus by the following method: the cultured 293 cells were digested, and seeded in a 6-well plate at a concentration of 105 cells/well, with a culture volume of 1 ml; after 24 hours, 10 μL of the virus containing the regulatory vector was added, and the culture was continued in an incubator for an additional 24 hours, then the supernatant was discarded, and the medium was replaced by a fresh medium to continue the culture; after the cells were full, they were transferred out to a culture flask, and puromycin at a concentration suitable or the cells was added to continue the culture; the medium was replaced every two days, and the concentration of the puromycin was kept at 3 μg/ml; after screening for one week, the surviving cells were the cells stably expressing the regulatory protein, and named 293 (GMCSF).

Example 3: Construction of IL2-Expressing Cells

The coding region of the canine IL2 (Genbank Accession No.: NM_001003305) gene was synthesized. The synthesized gene had BamHI and XhoI restriction sites at the two ends respectively, and then was digested with BamHI and XhoI enzymes. The system was as follows: 5 μg of IL2 plasmid, 4 μl of enzyme digestion buffer, 1 μL of BamHI, 1 μL of XhoI, supplemented with water to a final volume of 40 μL. The mixture was stood at 37° C. for 12 hours. The EP tube was taken out, and 4.4 μL of 10× loading buffer was added, and then the resulting mixture was subjected to 1% agarose gel electrophoresis. After the electrophoresis, the IL2 gene segment was recovered for later use.

Expression vector pLentis-CMV-MCS-IRES-PURO was digested. The system was as follows: 2 μg of plasmid, 3 μL of enzyme digestion buffer, 1 μL of BamHI, 1 μL of XhoI, supplemented with water to a final volume of 30 μL. The mixture was stood at 37° C. for 12 hours. The EP tube was taken out, and 3.3 μL of 10× loading buffer was added, and then the resulting mixture was subjected to 1% agarose gel electrophoresis. After the electrophoresis, the vector segment was recovered for later use.

The pLentis-CMV-MCS-IRES-PURO was ligated with IL2. The system was as follows: 2 μL of pLentis-CMV-MCS-IRES-PURO, 2 μL of IL2, 1 μL of ligase buffer, 0.5 μL of T4 DNA ligase, and 4.5 μL of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sent for sequencing, and it was confirmed that the construction was successful. The expression vector was pLentis-CMV-IL2-PGK-PURO.

A virus containing the regulatory vector was prepared, wherein the method was as follows: 1. cultured 293FT cells were digested, after counting, 3×106 cells/well were spread onto a 10-cm culture dish, and the volume of the culture solution was 10 ml; 2. on the next night, the cell status was observed and if the cell status was good, the cells could be transfected; chloroquine was added to the culture plate to a final concentration of 25 μm, one test tube was taken and added with sterilized water and the following plasmids (5 μg of pMD2.G+15 μg of pSPAX2+20 μg of pLentis-CMV-IL2-PGK-PURO) with a total volume of 1045 μL then added with 155 μL of 2M CaCl$_2$, mixed evenly, and finally added with 1200 μL of 2×HBS; the test tube was oscillated while dropwise adding these components; after dropwise adding was completed, the mixture was quickly added into the cell culture wells, and shaken gently and mixed evenly; 3. on the third morning, the cell status was observed, and the medium was replaced by 10 ml of fresh DMEM medium; 4. on the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was absorbed with absorbent paper as much as possible, and then the precipitate was re-suspended with 500 μL of HSS, dissolved for 2 hours, then packed into small tubes, and stored at −70° C.

The 293 cells were transfected with the virus by the following method: the cultured 293 cells were digested, and seeded in a 6-well plate at a concentration of 105 cells/well, with a culture volume of 1 ml; after 24 hours, 10 μL of the virus containing the regulatory vector was added, and the culture was continued in an incubator for an additional 24 hours, then the supernatant was discarded, and the medium was replaced by a fresh medium to continue the culture; after the cells were full, they were transferred out to a culture flask, and puromycin at a concentration suitable for the cells was added to continue the culture; the medium was replaced every two days, and the concentration of the puromycin was kept at 3 μg/ml; after screening for one week, the surviving cells were the cells stably expressing the regulatory protein, and named 293 (IL2).

Example 4: Expression of Protein Molecule cIL12bIL12aIL2GMCSF 4.1 Construction of Expression Vector The protein molecule cIL12bIL12aIL2GMCSF had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 μg of plasmid, 4 μl of enzyme digestion buffer, 1 μl of BamHI, 1 μl of XhoI, supplemented with water to a final volume of 40 μl. The mixture was stood at 37° C. for 12 hours. The EP tube was taken out, and 4.4 μl of 10× loading buffer was added, and then the resulting mixture was subjected to 1% agarose gel electrophoresis. After the electrophoresis, the segment was recovered for later use.

The vector pLentis-CMV-MCS-IRES-PURO was digested in an EP tube and the system was as follows: 2 μg of pLentis-CMV-MCS-IRES-PURO plasmid vector, 3 μl of enzyme digestion buffer, 1 μl of BamHI, 1 μl of XhoI, supplemented with water to a final volume of 30 μl. The mixture was stood at 37° C. for 12 hours. The EP tube was taken out, and 3.3 μl of 10× loading buffer was added, and then the resulting mixture was subjected to 1% agarose gel electrophoresis. After the electrophoresis, the pLentis-CMV-MCS-IRES-PURO vector segment was recovered for later use.

The cIL12bIL12aIL2GMCSF was ligated with the pLentis-CMV-MCS-IRES-PURO. The system was as follows: 2 μl of pLentis-CMV-MCS-IRES-PURO vector segment, 2 μl of gene segment, 1 μl of ligase buffer, 0.5 μl of T4 DNA ligase, and 4.5 μl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector pLentis-CMV-cIL12bIL12aIL2GMCSF-IRES-PURO was obtained.

4.2 Preparation of Expression Virus

1) Cultured 293FT cells were digested, after counting, 3×106 cells/well were spread onto a 10-cm culture dish, and the volume of the culture solution was 10 ml.

2) On the next night, the cell status was observed and if the cell status was good, the cells could be transfected. Chloroquine was added to the culture plate to a final concentration of 25 μM, one test tube was taken and added with sterilized water and the following plasmids (6 μg of pMD2.G+15 μg of pSPAX2+20 μg of expression vector) with a total volume of 1045 μl, then added with 155 μl of 2M CaCl$_2$, mixed evenly, and finally added with 1200 μl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was absorbed with absorbent paper as much as possible, and then the precipitate was re-suspended with 200 μl of HBSS, dissolved for 2 hours, then packed into small tubes, and stored at −70° C.

4.3 Preparation of Expression Cells

Cultured 293A cells were digested, and seeded in a 6-well plate at a concentration of 105 cells/well, with a culture volume of 1 ml. After 24 hours, 10 μl of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 μg/ml was added to continue the culture. The medium was replaced every two days, and the concentration of the puromycin was kept. After screening for one week, the surviving cells were the cells stably expressing the protein, and named 293A-cIL12bIL12aIL2GMCSF.

4.4 Protein Expression and Purification

The constructed cIL12bIL12aIL2GMCSF-expressing cells 293A-cIL12bIL12aIL2GMCSF were sub-cultured into a 15-cm culture dish. After the cells were full, the medium was replaced by 30 ml of CDM4HEK293 to continue the culture for an additional 5 days, and then the supernatant was collected, filtered by a 0.45 μm filter, and ultra-filtered and concentrated with AMICON ULTRA-15 of 50 kd. The concentrated protein solution obtained was purified with nickel-chelated magnetic beads (Beaver Biosciences and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL12p70 ELISA kit. After the protein concentration was adjusted to 2 μg/μl by PBS, the protein solution was packed and then stored at −20° C.

Example 5: Expression of Protein Molecule cIL12bIL12aGMCSFIL2

5.1 Construction of Expression Vector

The protein molecule cIL12bIL12aGMCSFIL2 had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 μg of plasmid, 4 μl of enzyme digestion buffer, 1 μl of BamHI, 1 μl of XhoI, supplemented with water to a final volume of 40 μl. The mixture was stood at 37° C. for 12 hours. The EP tube was taken out, and 4.4 μl of 1% loading buffer was added, and then the resulting mixture was subjected to 1% agarose gel electrophoresis. After the electrophoresis, the segment was recovered for later use.

The vector pLentis-MCS-IRES-PURO was digested in an EP tube and the system was as follows: 2 μg of pLentis-CMV-MCS-IRES-PURO plasmid vector, 3 μl of enzyme digestion buffer, 1 μl of BamHI, 1 μl of XhoI, supplemented with water to a final volume of 30 μl. The mixture was stood at 37° C. for 12 hours. The EP tube was taken out, and 3.3 μl of 10× loading buffer was added, and then the resulting mixture was subjected to 1% agarose gel electrophoresis. After the electrophoresis, the pLentis-CMV-MCS-IRES-PURO vector segment was recovered for later use.

The cIL12bIL12aGMCSFIL2 was ligated with the pLentis-CMV-MCS-IRES-PURO. The system was as follows: 2 μl of pLentis-CMV-MCS-IRES-PURO vector segment, 2 μl of gene segment, 1 μl of ligase buffer, 0.5 μl of T4 DNA ligase, and 4.5 μl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector pLentis-CMV-cIL12bIL12aGMCSFIL2-IRES-PURO was obtained.

5.2 Preparation of Expression Virus

1) Cultured 293FT cells were digested, after counting, 3×106 cells/well were spread onto a 10-cm culture dish, and the volume of the culture solution was 10 ml.

2) On the next night, the cell status was observed and if the cell status is good, the cells could be transfected. Chloroquine was added to the culture plate to a final concentration of 25 μM, one test tube was taken and added with sterilized water and the following plasmids (6 μg of pMD2.G+15 μg of pSPAX2+20 μg of expression vector) with a total volume of 1045 μl, then added with 155 μl of 2M CaCl₂, mixed evenly, and finally added with 1200 μl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant the culture dish was collected, filtered with a 0.45 filter, then placed in a high-speed centrifuge tube, and centrifuged at 50000 g for 2 hours; the supernatant was carefully discarded, the liquid was absorbed with absorbent paper as much as possible, and then the precipitate was re-suspended with 200 of HBSS, dissolved for 2 hours, then packed into small tubes, and stored at −70° C.

5.3 Preparation of Expression Cells

Cultured 293A cells were digested and seeded in a 6-well plate at a concentration of 105 cells/well, with a culture volume of 1 ml. After 24 hours, 10 μl of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 μg/ml was added to continue the culture. The medium was replaced every two days, and the concentration of the puromycin was kept. After screening for one week, the surviving cells were cells stably expressing the protein, and named 293A-cIL12bIL12aGMCSFIL2.

5.4 Protein Expression and Purification

The constructed cIL12bIL12aGMCSFIL2-expressing cells 293A-cIL12bIL12aGMCSFIL2 were sub-cultured into a 15-cm culture dish. After the cells were full, the medium was replaced by 30 ml of CDM4HEK293 to continue the culture for an additional 5 days, and then the supernatant was collected, filtered by a 0.45 μm filter, and ultra-filtered and concentrated with AMICON ULTRA-15 of 50 kd. The concentrated protein solution obtained was purified with nickel-chelated magnetic beads (Beaver Biosciences Inc.), and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL12p70 ELISA kit. After the protein concentration was adjusted to 2 μg/μl by PBS, the protein solution was packed and then stored at −20° C.

Example 6: Expression of Protein Molecule fIL12bIL12alt2GMCSF 6.1 Construction of Expression Vector The protein molecule fIL12bIL12aIL2GMCSF had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 µg of plasmid, 4 µl of enzyme digestion buffer, 1 µl of BamHI, 1 µl of XhoI, supplemented with water to a final volume of 40 µl. The mixture was stood at 37° C. for 12 hours. The EP tube was taken out, and 4.4 µl of 10× loading buffer was added, and then the resulting mixture was subjected to 1% agarose gel electrophoresis. After the electrophoresis, the segment was recovered for later use.

The vector Lentis-CMV-MCS-IRES-PURO was digested in an EP tube and the system was as follows: 2 µg of pLentis-CMV-MCS-IRES-PURO plasmid vector, 3 µl of enzyme digestion buffer, 1 µl of BamHI, 1 µl of XhoI, supplemented with water to a final volume of 30 µl. The mixture was stood at 37° C. for 12 hours. The EP tube was taken out, and 3.3 µl of 10× loading buffer was added, and then the resulting mixture was subjected to 1% agarose gel electrophoresis. After the electrophoresis, the pLentis-CMV-MCS-IRES-PURO vector segment was recovered for later use.

The fIL12bIL12aIL2GMCSF was ligated with the pLentis-CMV-MCS-IRES-PURO. The system was as follows: 2 µl of pLentis-CMV-MCS-IRES-PURO vector segment, 2 µl of gene segment, of ligase buffer, 0.5 µl of T4 DNA ligase, and 4.5 µl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector pLentis-CMV-fIL12bIL12aIL2GMCSF-IRES-PURO was obtained.

6.2 Preparation of Expression Virus

1) Cultured 2931FT cells were digested, after counting, 3×106 cells/well were spread onto a 10-cm culture dish, and the volume of the culture solution was 10 ml.

2) On the next night, the cell status was observed and if the cell status was good, the cells could be transfected. Chloroquine was added to the culture plate to a final concentration of 25 µM, one test tube was taken and added with sterilized water and the following plasmids (6 µg of pMD2.G+15 µg of pSPAX2+20 µg of expression vector) with a total volume of 1045 µl, then added with 155 µl of 2M CaCl$_2$, mixed evenly, and finally added with 1200 µl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant in the culture dish was collected, filtered with a 0.45 µm filter, then placed in a high-speed centrifuge tube, and centrifuged at 50000 g for 2 hours; the supernatant was carefully discarded, the liquid was absorbed with adsorbent paper as much as possible, and then the precipitate was re-suspended with 200 µl of HBSS, dissolved for 2 hours, then packed into small tubes, and stored at −70° C.

6.3 Preparation of Expression Cells

Cultured 293A cells were digested and seeded in a 6-well plate at a concentration of 105 cells/well, with a culture volume of 1 ml. After 24 hours, 10 µl of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 µg/ml was added to continue the culture. The medium was replaced every two days, and the concentration of the puromycin was kept. After screening for one week, the surviving cells were the cells stably expressing the protein, and named 293A-fIL12bIL12aIL2GMCSF.

6.4 Protein Expression and Purification

The constructed fIL12bIL12aIL2GMCSF-expressing cells 293A-fIL12bIL12aIL2GMCSF were sub-cultured into a 15-cm culture dish. After the cells were full, the medium was replaced by 30 ml of CDM4HEK293 to continue the culture for an additional 5 days, and then the supernatant was collected, filtered by a 0.45 µm filter, and ultra-filtered and concentrated with AMICON ULTRA-15 of 50 kd. The concentrated protein solution obtained was purified with nickel-chelated magnetic beads (Beaver Biosciences and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL12p70 ELISA kit. After the protein concentration was adjusted to 2 µg/µl by PBS, the protein solution was packed and then stored at −20° C.

Example 7: Expression of Protein Molecule 2aGMCSFIL2

7.1 Construction of Expression Vector

The protein molecule fIL12bIL12aGMCSFIL2 had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 µg of plasmid, 4 µl of enzyme digestion buffer, 1 µl of BamHI, 1 µl of XhoI, supplemented with water to a final volume of 40 µl. The mixture was stood at 37° C. for 12 hours. The EP tube was taken out, and 4.4 µl of 10× loading buffer was added, and then the resulting mixture was subjected to 1% agarose gel electrophoresis. After the electrophoresis, the segment was recovered for later use.

The vector pLentis-CMV-MCS-IRES-PURO was digested in an EP tube and the system was as follows: 2 µg of pLentis-CMV-MCS-IRES-PURO plasmid vector, 3 µl of enzyme digestion buffer, 1 µl of BamHI, 1 µl of XhoI, supplemented with water to a final volume of 30 µl. The mixture was stood at 37° C. for 12 hours. The EP tube was taken out, and 3.3 µl of 10× loading buffer, was added, and then the resulting mixture was subjected to 1% agarose gel electrophoresis. After the electrophoresis, the pLentis-CMV-MCS-IRES-PURO vector segment was recovered for later use.

The fIL12bIL12aGMCSFIL2 was ligated with the pLentis-CMV-MCS-IRES-PURO. The system was as follows: 2 µL of pLentis-CMV-MCS-IRES-PURO vector segment, 2 µl of gene segment, 1 µl of ligase buffer, 0.5 µl of T4 DNA ligase, and 4.5 µl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector pLentis-CMV-fIL12bIL12aGMCSFIL2-IRES-PURO was obtained.

7.2 Preparation of Expression Virus

1) Cultured 293FT cells were digested, after counting, 3×106 cells/well were spread onto a 10-cm culture dish, and the volume of the culture solution was 10 ml.

2) On the next night, the cell status was observed and if the cell status was good, the cells could be transfected. Chloroquine was added to the culture plate to a final concentration of 25 µM, one test tube was taken and added with sterilized water and the following plasmids (6 µg of pMD2.G+15 µg of pSPAX2+20 µg of expression vector) with a total volume of 1045 µl, then added with 155 µl of 2M CaCl$_2$, mixed evenly, and finally added with 1200 µl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant the culture dish was collected, filtered with a 0.45 µm filter, then placed in a high-speed centrifuge tube, and centrifuged at 50000 g for 2 hours; the supernatant was carefully discarded, the liquid was absorbed with absorbent paper as much as possible, and then the precipitate was re-suspended with 200 of HBSS, dissolved for 2 hours, then packed into small tubes, and stored at −70° C.

7.3 Preparation of Expression Cells

Cultured 293A cells were digested and seeded in a 6-well plate at a concentration of 105 cells/well, with a culture volume of 1 ml. After 24 hours, of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 µg/ml was added to continue the culture. The medium was replaced every two days, and the concentration of the puromycin was kept. After screening for one week, the surviving cells were the cells stably expressing the protein, and named 293A-171L12bIL12aGMCSFIL2.

7.4 Protein Expression and Purification

The constructed fIL12bIL12aGMCSFIL2-expressing cells 293A-fIL12bIL12aGMCSFIL2 were sub-cultured into a 15-cm culture dish. After the cells were full, the medium was replaced by 30 ml of CDM4HEK293 to continue the culture for an additional 5 days, and then the supernatant was collected, filtered by a 0.45 um filter, and ultra-filtered and concentrated with AMICON ULTRA-15 of 50 kd. The concentrated protein solution obtained was purified with nickel-chelated magnetic beads (Beaver Biosciences Inc.), and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL12p70 ELISA kit. After the protein concentration was adjusted to 2 µg/µl by PBS, the protein solution was packed and then stored at −20° C.

Example 8: Expression of Protein Molecule cIL12bIL12aIL2DiaNHS76F8GMCSF 8.1 Construction of Expression Vector The protein molecule cIL12bIL12alt2DiaNHS76F8 GMCSF had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 µg of plasmid, 4 µl of enzyme digestion buffer, 1 µl of BamHI, 1 µl of XhoI, supplemented with water to a final volume of 40 µl. The mixture was stood at 37° C. for 12 hours. The EP tube was taken out and 4.4 µl of 10× loading buffer was added, and then the resulting mixture was subjected to 1% agarose gel electrophoresis. After the electrophoresis, the segment was recovered for later use.

The vector pLentis-CMV-MCS-IRES-PURO was digested in an EP tube and the system was as follows: 2 µg of pLentis-CMV-MCS-IRES-PURO plasmid vector, 3 µl of enzyme digestion buffer, 1 µl of BamHI, 1 µl of XhoI, supplemented with water to a final volume of 30 µl. The mixture was stood at 37° C. for 12 hours. The EP tube was taken out and 3.3 µl of 10× loading buffer was added, and then the resulting mixture was subjected to 1% agarose gel electrophoresis. After the electrophoresis, the pLentis-CMV-MCS-IRES-PURO vector segment was recovered for later use.

The cIL12bIL12aIL2DiaNHS76F8GMCSF was ligated with the pLentis-CMV-MCS-IRES-PURO. The system was as follows: 2 µl of pLentis-CMV-MCS-IRES-PURO vector segment, 2 µl of gene segment, 1 µl of ligase buffer, 0.5 µl of T4 DNA ligase, and 4.5 µl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector: pLentis-CMV-cIL12bIL12aIL2DiaNHS7 6F8GMCSF-IRES-PURO was obtained.

8.2 Preparation of Expression Virus

1) Cultured 293FT cells were digested, after counting, 3×106 cells/well were spread onto a 10-cm culture dish, and the volume of the culture solution was 10 ml.

2) On the next night, the cell status was observed and if the cell status was good, the cells could be transfected. Chloroquine was added to the culture plate to a final concentration of 25 µM, one test tube was taken and added with sterilized water and the following plasmids (6 µg of pMD2.G+15 µg of pSPAX2+20 µg of expression vector) with a total volume of 1045 µl, then added with 155 µl of 2M CaCl$_2$, mixed evenly, and finally added with 1200 µl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was absorbed with adsorbent paper as much as possible, and then the precipitate was re-suspended with 200 μl of HBSS, dissolved for 2 hours, then packed into small tubes, and stored at −70° C.

8.3 Preparation of Expression Cells

Cultured 293A cells were digested and seeded in a 6-well plate at a concentration of 105 cells/well, with a culture volume of 1 ml. After 24 hours, 10 μl of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 μg/ml was added to continue the culture The medium was replaced every two days, and the concentration of the puromycin was kept. After screening for one week, the surviving cells were the cells stably expressing the protein, and named 293A-cIL12bIL12aIL2DiaNHS76F8GMCSF.

8.4 Protein Expression and Purification

The constructed cIL12bIL12aIL2DiaNHS76F8GMCSF-expressing cells 293A-cIL12bIL12aIL2DiaNHS 76F8GMCSF were sub-cultured into a 15-cm culture dish. After the cells were full, the medium was replaced by 30 ml of CDM4HEK293 to continue the culture for an additional 5 days, and then the supernatant was collected, filtered by a 0.45 μm filter, and ultra-filtered and concentrated with AMICON ULTRA-15 of 50 kd. The concentrated protein solution obtained was purified with nickel-chelated magnetic beads (Beaver Biosciences Inc.), and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL12p70 ELISA kit. After the protein concentration was adjusted to 2 μg/μl by PBS, the protein solution was packed and then stored at −20° C.

Example 9: Expression of Protein Molecule 12bIL12aIL2DiaNHS76F8GMCSF 9.1 Construction of Expression Vector The protein molecule fIL12bIL12aIL2DiaNHS76 F8GMCSF had a secretory signal peptide at the front end thereof and was added with 6*His at the back end thereof to facilitate purification. The DNA sequence corresponding to the gene was synthesized, and the BamHI or XhoI site in the sequence was mutated to a degenerate codon. The front and back ends of the synthesized sequence were respectively provided with BamHI and XhoI restriction sites. The synthesized plasmid carrying the target gene was digested and the system was as follows: 5 μg of plasmid, 4 μl of enzyme digestion buffer, 1 μl of BamHI, 1 μl of XhoI, supplemented with water to a final volume of 40 μl. The mixture was stood at 37° C. for 12 hours. The EP tube was taken out and 4.4 μl of 10× loading buffer was added, and then the resulting mixture was subjected to 1% agarose gel electrophoresis. After the electrophoresis, the segment was recovered for later use.

The vector pLentis-CMV-MCS-IRES-PURO was digested in an EP tube and the system was as follows: 2 μg of pLentis-CMV-MCS-IRES-PURO plasmid vector, 3 μl of enzyme digestion buffer, 1 μl of BamHI, 1 μl of XhoI, supplemented with water to a final volume of 30 μl. The mixture was stood at 37° C. for 12 hours. The EP tube was taken out, and 3.3 μl of 10× loading buffer was added, and then the resulting mixture was subjected to 1% agarose gel electrophoresis. After the electrophoresis, the pLentis-CMV-MCS-IRES-PURO vector segment was recovered for later use.

The fIL12bIL12aIL2DiaNHS76F8GMCSF was ligated with the pLentis-CMV-MCS-IRES-PURO. The system was as follows: 2 μl of pLentis-CMV-MCS-IRES-PURO vector segment, 2 μl of gene segment, 1 μl of ligase buffer, 0.5 μl of T4DNA ligase, and 4.5 μl of water. The mixture was placed at room temperature to ligate for 4 hours. Then, the ligation system was transformed into competent *Escherichia coli* cells. On the second day, a bacterial colony was picked from the transformed plate, inoculated into LB medium and cultured overnight at 37° C. in a shaker. The plasmids were extracted from the cultured bacteria by using the plasmid extraction kit. Enzyme digestion was conducted to determine whether the segment was successfully ligated into the vector, then the correct vector was sequenced, and it was confirmed that the construction was successful. Expression vector: pLentis-CMV-fIL12bIL12aIL2DiaNHS76 F8GMCSF-IRES-PURO was obtained.

9.2 Preparation of Expression Virus

1) Cultured 293FT cells were digested, after counting, 3×106 cells/well were spread onto a 10-cm culture dish, and the volume of the culture solution was 10 ml.

2) On the next night, the cell status was observed and if the cell status was good, the cells could be transfected. Chloroquine was added to the culture plate to a final concentration of 25 μM, one test tube was taken and added with sterilized water and the following plasmids (6 μg of pMD2.G+15 μg of pSPAX2+20 μg of expression vector) with a total volume of 1045 μl, then added with 155 μl of 2M CaCl$_2$, mixed evenly, and finally added with 1200 μl of 2×HBS. The test tube was oscillated while dropwise adding these components. After dropwise adding was completed, the mixture was quickly added into the cell culture wells, and shaken gently and mixed evenly.

3) On the third morning, the cell status was observed, and the medium was replaced by 10 ml of fresh DMEM medium.

4) On the fifth morning, the cell status was observed; the supernatant in the culture dish was collected, filtered with a 0.45 μm filter, then placed in a high-speed centrifuge tube, and centrifuged at 50000 g for 2 hours; the supernatant was carefully discarded, the liquid was absorbed with adsorbent paper as much as possible, and then the precipitate was re-suspended with 200 μl of HBSS, dissolved for 2 hours, then packed into small tubes, and stored at −70° C.

9.3 Preparation of Expression Cells

Cultured 293A cells were digested and seeded in a 6-well plate at a concentration of 105 cells/well, with a culture volume of 1 ml. After 24 hours, 10 μl of virus expressing the above target gene was added, and the culture was continued in an incubator for an additional 24 hours, then the supernatant was discarded, and the medium was replaced by a fresh medium to continue the culture. After the cells were full, they were transferred out to a culture flask, and puromycin at a final concentration of 3 μg/ml was added to continue the culture. The medium was replaced every two days, and the concentration of the puromycin was kept. After screening for one week, the surviving cells were the cells stably expressing the protein, and named 293A-fIL12bIL12aIL2DiaNHS76178GMCSF.

9.4 Protein Expression and Purification

The constructed fIL12bIL12aIL2DiaNHS76F8GMCSF-expressing cells 293A-fIL12bIL12aIL2DiaNHS76 F8GMCSF were sub-cultured into a 15-cm culture dish. After the cells were full, the medium was replaced by 30 ml of CDM4HEK293 to continue the culture for an additional 5 days, and then the supernatant was collected, filtered by a 0.45 μm filter, and ultra-filtered and concentrated with AMICON ULTRA-15 of 50 kd. The concentrated protein solution obtained was purified with nickel-chelated magnetic beads (Beaver Biosciences Inc.), and the operation flow was carried out according to the instruction. The purified protein solution obtained was ultra-filtered with an AMICON ULTRA-0.5 ultrafiltration tube, and the buffer was replaced by PBS. The protein concentration of the protein solution finally obtained was detected with an IL1.2p70 ELISA kit. After the protein concentration was adjusted to 2 μg/μl by PBS, the protein solution was packed and then stored at −20° C.

Example 10: Example of Treating Canine Tumor with cIL12bIL12aIL2GMCSF

The purified cIL12bIL12aIL2GMCSF fusion protein solution was mixed with 3% chitosan in a volume ratio of 1:1, and then packed in 1 ml/vial. The mixture was mixed just before use. Three vials of the reagent were injected intratumorally each time, and the intratumoral injection was carried out once every 15 days for three consecutive times. The size of the tumor was recorded as follows:

Note: "c" indicated that the fusion protein was a canine protein, which was the same in the whole text.

Figure 2:
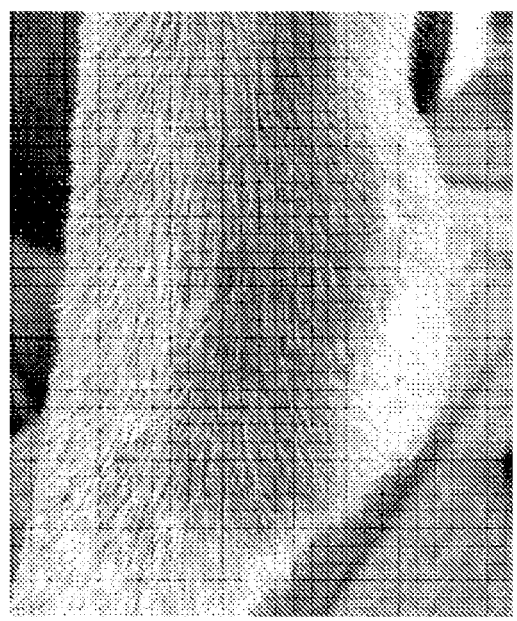
FIG. 2 is a comparative photograph of a canine right foreleg sarcoma after administration according to the treatment of Example 10 of the present invention.

A deer dog, 10 years old, had sarcoma in the right foreleg (see FIG. 1) in a size of 65 mm*65 mm*55 mm. As shown in Table 1, after intratumoral injection for three times, the tumor area was decreased by 85%. The tumor volume was decreased by about 95% (see FIG. 2). After administration, the body temperature was normal, and no other adverse reactions were observed.

Example 11: Example of Treating Canine Tumor with cIL12bIL12aGMCSFIL2

The purified cIL12bIL12aGMCSFIL2 fusion protein solution was mixed with 3% chitosan in a volume ratio of 1:1, and then packed in a volume of 1 ml/vial. The mixture was mixed just before use. Three vials of the reagent were injected intratumorally each time, and the intratumoral injection was carried out once every 15 days for three consecutive times. The size of the tumor was recorded as follows:

|  | Time after administration (day) | | | | | |
|---|---|---|---|---|---|---|
|  | 0 | 20 | 40 | 60 | 80 | 100 |
| Size of tumor (mm) | 140*90 | 120*80 | 90*75 | 60*40 | 60*40 | 60*40 |

A samoyed dog, 13 years old, suffered from thyroid cancer, and the size of the tumor was about 140 mm*90 mm. As shown in Table 2, after intratumoral injection for three times, the tumor area was decreased by 80%. After administration, the body temperature was normal, and no other adverse reactions were observed.

Example 12: Example of Treating Feline Tumor with fIL12bIL12aIL2GMCSF

The purified fIL12bIL12aIL2GMCSF fusion protein solution was mixed with 3% chitosan in a volume ratio of 1:1, and then packed in 1 ml/vial. The mixture was mixed just before use. Two vials of the reagent were injected intratumorally each time, and the intratumoral injection was carried out once every 15 days for three consecutive times. The size of the tumor was recorded as follows:

|  | Time after administration (day) | | | | | |
|---|---|---|---|---|---|---|
|  | 0 | 20 | 40 | 60 | 80 | 100 |
| Size of tumor (mm) | 45*35 | 40*30 | 30*25 | 20*20 | 15*10 | 10*5 |

Note: "f" indicated that a fusion protein was a feline protein, which was the same in the whole text.

A mixed-breed cat, 12 years old, suffered from breast basal cell carcinoma, and the size of the tumor was 45 mm*35 mm. As shown in Table 2, after intratumoral injection for three times, the tumor area was decreased by 95%. After administration, the body temperature was normal, and no other adverse reactions were observed.

Example 13: Example of Treating Feline Tumor with fIL12bIL1.2aGMCSFIL2

The purified fIL12bIL12aGMCSFIL2 fusion protein solution was mixed with 3% chitosan in a volume ratio of 1:1, and then packed in 1 ml/vial. The mixture was mixed just before use. One vial of the reagent was injected intratumorally each time, and the intratumoral injection was carried out once every 30 days for three consecutive times. The size of the tumor was recorded as follows:

|  | Time after administration (day) | | | | |
|---|---|---|---|---|---|
|  | 0 | 30 | 60 | 90 | 120 |
| Size of tumor (mm) | 25 * 20 | 22 * 18 | 17 * 15 | 13 * 10 | 10 * 10 |

A mixed-breed cat, 11 years old, suffered from squamous cell carcinoma in a tongue root, and the size of the tumor was 25 mm*20 mm. As shown in Table 4, after intratumoral injection for three times, the tumor area was decreased by 80%. After administration, the body temperature was normal, and no other adverse reactions were observed.

Example 14: Example of Treating Canine Tumor with cIL12bIL12aIL2DiaNHS76F8GMCSF The purified cIL12bIL2aIL2DiaNHS76F8MCSF fusion protein solution was mixed with 3% chitosan in a volume ratio of 1:1, and then packed in 1 ml/vial. The mixture was mixed just before use. Two vials of the reagent were injected intratumorally each time, and the intratumoral injection was carried out once every 15 days for three consecutive times.

The size of the tumor was recorded as follows:

|  | Time after administration (day) | | | | | |
| --- | --- | --- | --- | --- | --- | --- |
|  | 0 | 20 | 40 | 60 | 80 | 100 |
| Size of tumor (mm) | 78*60 | 70*56 | 60*50 | 50*35 | 30*20 | 30*20 |

A mixed-breed dog, 12 years old, suffered from breast cancer, and the size of the tumor was 78 mm*60 mm. As shown in Table 3, after intratumoral injection for three times, the tumor area was decreased by 87%. After administration, the body temperature was normal, and fever or other adverse reactions were not observed.

Example 15: Example of Treating Feline Tumor with fIL12bIL12aIL2DiaNHS76F8GMCSF The purified fIL12bIL12aIL2DiaNHS76F8GMCSF fusion protein solution was mixed with 3% chitosan in a volume ratio of 1:1, and then packed in 1 ml/vial. The mixture was mixed just before use. Two vials of the reagent were injected intratumorally each time, and the intratumoral injection was carried out once every 15 days for three consecutive times. The size of the tumor was recorded as follows:

|  | Time after administration (day) | | | | | |
| --- | --- | --- | --- | --- | --- | --- |
|  | 0 | 20 | 40 | 60 | 80 | 100 |
| Size of tumor (mm) | 55*45 | 53*45 | 45*30 | 30*25 | 20*15 | 20*15 |

A mixed-breed cat, 13 years old, suffered from breast cancer, and the size of the tumor was 55 mm*45 mm. As shown in Table 4, after intratumoral injection for three times, the tumor area was decreased by 88%. After administration, the body temperature was normal, and fever or other adverse reactions were not observed.

The examples are only used to explain the present invention, and are not intended to limit the present invention. After reading the specification, those skilled in the art can make modifications without creative contribution to the examples as needed, but the modifications are protected by the patent law as long as the modifications fall within the scope of the claims of the present invention.

The invention claimed is:

1. A fusion protein for treating animal tumors, wherein the fusion protein comprises IL12, IL2 and GMCSF peptide fragments, wherein the IL12, IL2 and GMCSF peptide fragments are obtained from felines or canines, and wherein the fusion protein is set forth in SEQ ID NO: 5, or SEQ ID NO: 6.

2. A composition for treating animal tumors, comprising the fusion protein according to claim 1 and a chitosan solution.

3. The composition according to claim 2, wherein the composition comprises from 30 vol % to 70 vol % of fusion protein solution and from 70 vol % to 30 vol % of the chitosan solution.

4. The composition according to claim 3, wherein the composition comprises 50 vol % of fusion protein solution and 50 vol % of the chitosan solution.

5. The composition according to claim 2, wherein the chitosan solution contains from 1 wt % to 10 wt % of chitosan.

6. The composition according to claim 5, wherein the chitosan solution contains from 3 wt % to 8 wt % of chitosan.

7. The composition according to claim 6, wherein the chitosan solution contains 3 wt % of chitosan.

8. A method for treating an animal, with the fusion protein according to claim 1, comprises administering the fusion protein according to claim 1 to a subject.

9. The method according to claim 8, wherein a composition comprising the fusion protein according to claim 1 and a chitosan solution is administered.

10. The method according to claim 8, wherein the treating includes treating one or more selected from the group consisting of melanoma, cancer Hodgkin's disease, non-Hodgkin's lymphoma, soft tissue sarcoma, myeloid leukemia, lymphoblastic leukemia, lymphocytic leukemia, lymphocytic lymphoma, central nervous system neoplasm, primary central nervous system lymphoma, tumor angiogenesis, spinal axis tumor, brainstem glioma, pituitary adenoma, Kaposi's sarcoma, T cell lymphoma, trunk sarcoma and basal cell tumor.

11. The method according to claim 9, wherein the composition comprises from 30 vol % to 70 vol % of fusion protein solution and from 70 vol % to 30 vol % of the chitosan solution.

12. The method according to claim 11, wherein the composition comprises 50 vol % of fusion protein solution and 50 vol % of the chitosan solution.

13. The method according to claim 9, wherein the chitosan solution contains from 1 wt % to 10 wt % of chitosan.

14. The method according to claim 13, wherein the chitosan solution contains from 3 wt % to 8 wt % of chitosan.

15. The method according to claim 14, wherein the chitosan solution contains 3 wt % of chitosan.

* * * * *

SEQUENCE LISTING

```
<160> NUMBER OF SEQ ID NOS: 6

<210> SEQ ID NO 1
<211> LENGTH: 817
<212> TYPE: PRT
<213> ORGANISM: Artificial Sequence
<220> FEATURE:
<221> NAME/KEY: SIGNAL
<222> LOCATION: (1)..(817)
<223> OTHER INFORMATION: Fusion protein

<400> SEQUENCE: 1

Ile Trp Glu Leu Glu Lys Asp Val Tyr Val Glu Leu Asp Trp His
1               5                   10                  15

Pro Asp Ala Pro Gly Glu Met Val Val Leu Thr Cys His Thr Pro Glu
                20                  25                  30

Glu Asp Asp Ile Thr Trp Thr Ser Ala Gln Ser Ser Glu Val Leu Gly
            35                  40                  45

Ser Gly Lys Thr Leu Thr Ile Gln Val Lys Glu Phe Gly Asp Ala Gly
    50                  55                  60

Gln Tyr Thr Cys His Lys Gly Gly Lys Val Leu Ser Arg Ser Leu Leu
65                  70                  75                  80

Leu Ile His Lys Lys Glu Asp Gly Ile Trp Ser Thr Asp Ile Leu Lys
                85                  90                  95

Glu Gln Lys Glu Ser Lys Asn Lys Ile Phe Leu Lys Cys Glu Ala Lys
            100                 105                 110

Asn Tyr Ser Gly Arg Phe Thr Cys Trp Trp Leu Thr Ala Ile Ser Thr
        115                 120                 125

Asp Leu Lys Phe Ser Val Lys Ser Ser Arg Gly Phe Ser Asp Pro Gln
    130                 135                 140

Gly Val Thr Cys Gly Ala Val Thr Leu Ser Ala Glu Arg Val Arg Val
145                 150                 155                 160

Asp Asn Arg Asp Tyr Lys Lys Tyr Thr Val Glu Cys Gln Glu Gly Ser
                165                 170                 175

Ala Cys Pro Ser Ala Glu Glu Ser Leu Pro Ile Glu Val Val Val Asp
```

```
            180                 185                 190
Ala Ile His Lys Leu Lys Tyr Glu Asn Tyr Thr Ser Ser Phe Phe Ile
            195                 200                 205

Arg Asp Ile Ile Lys Pro Asp Pro Thr Asn Leu Gln Leu Lys Pro
    210                 215                 220

Leu Lys Asn Ser Arg His Val Glu Val Ser Trp Glu Tyr Pro Asp Thr
225                 230                 235                 240

Trp Ser Thr Pro His Ser Tyr Phe Ser Leu Thr Phe Cys Val Gln Ala
                245                 250                 255

Gln Gly Lys Asn Asn Arg Glu Lys Lys Asp Arg Leu Cys Val Asp Lys
            260                 265                 270

Thr Ser Ala Lys Val Val Cys His Lys Asp Ala Lys Ile Arg Val Gln
        275                 280                 285

Ala Arg Asp Arg Tyr Tyr Ser Ser Trp Ser Asp Trp Ala Ser Val
    290                 295                 300

Ser Cys Ser Gly Gly Gly Ser Gly Gly Gly Ser Gly Gly Gly
305                 310                 315                 320

Gly Ser Arg Ser Leu Pro Thr Ala Ser Pro Ser Pro Gly Ile Phe Gln
                325                 330                 335

Cys Leu Asn His Ser Gln Asn Leu Leu Arg Ala Val Ser Asn Thr Leu
                340                 345                 350

Gln Lys Ala Arg Gln Thr Leu Glu Leu Tyr Ser Cys Thr Ser Glu Glu
            355                 360                 365

Ile Asp His Glu Asp Ile Thr Lys Asp Lys Thr Ser Thr Val Glu Ala
    370                 375                 380

Cys Leu Pro Leu Glu Leu Thr Met Asn Glu Ser Cys Leu Ala Ser Arg
385                 390                 395                 400

Glu Ile Ser Leu Ile Thr Asn Gly Ser Cys Leu Ala Ser Gly Lys Ala
                405                 410                 415

Ser Phe Met Thr Val Leu Cys Leu Ser Ser Ile Tyr Glu Asp Leu Lys
                420                 425                 430

Met Tyr Gln Met Glu Phe Lys Ala Met Asn Ala Lys Leu Leu Met Asp
            435                 440                 445

Pro Lys Arg Gln Ile Phe Leu Asp Gln Asn Met Leu Thr Ala Ile Asp
    450                 455                 460

Glu Leu Leu Gln Ala Leu Asn Phe Asn Ser Val Thr Val Pro Gln Lys
465                 470                 475                 480

Ser Ser Leu Glu Glu Pro Asp Phe Tyr Lys Thr Lys Ile Lys Leu Cys
                485                 490                 495

Ile Leu Leu His Ala Phe Arg Ile Arg Ala Val Thr Ile Asp Arg Met
                500                 505                 510

Met Ser Tyr Leu Asn Ser Ser Gly Gly Gly Ser Gly Gly Gly Gly
            515                 520                 525

Ser Gly Gly Gly Ser Ala Pro Ile Thr Ser Ser Thr Lys Glu
530                 535                 540

Thr Glu Gln Gln Met Glu Gln Leu Leu Leu Asp Leu Gln Leu Leu Leu
545                 550                 555                 560

Asn Gly Val Asn Asn Tyr Glu Asn Pro Gln Leu Ser Arg Met Leu Thr
                565                 570                 575

Phe Lys Phe Tyr Thr Pro Lys Lys Ala Thr Glu Phe Thr His Leu Gln
                580                 585                 590

Cys Leu Ala Glu Glu Leu Lys Asn Leu Glu Glu Val Leu Gly Leu Pro
                595                 600                 605
```

```
Gln Ser Lys Asn Val His Leu Thr Asp Thr Lys Glu Leu Ile Ser Asn
        610                 615                 620

Met Asn Val Thr Leu Leu Lys Leu Lys Gly Ser Glu Thr Ser Tyr Asn
625                 630                 635                 640

Cys Glu Tyr Asp Asp Glu Thr Ala Thr Ile Thr Glu Phe Leu Asn Lys
                645                 650                 655

Trp Ile Thr Phe Cys Gln Ser Ile Phe Ser Thr Leu Thr Gly Gly Gly
                660                 665                 670

Gly Ser Gly Gly Gly Ser Gly Gly Gly Ser Ala Pro Thr Arg
        675                 680                 685

Ser Pro Thr Leu Val Thr Arg Pro Ser Gln His Val Asp Ala Ile Gln
        690                 695                 700

Glu Ala Leu Ser Leu Leu Asn Asn Ser Asn Asp Val Thr Ala Val Met
705                 710                 715                 720

Asn Lys Ala Val Lys Val Val Ser Glu Val Phe Asp Pro Glu Gly Pro
                725                 730                 735

Thr Cys Leu Glu Thr Arg Leu Gln Leu Tyr Lys Glu Gly Leu Gln Gly
                740                 745                 750

Ser Leu Thr Ser Leu Lys Asn Pro Leu Thr Met Met Ala Asn His Tyr
        755                 760                 765

Lys Gln His Cys Pro Pro Thr Pro Glu Ser Pro Cys Ala Thr Gln Asn
770                 775                 780

Ile Asn Phe Lys Ser Phe Lys Glu Asn Leu Lys Asp Phe Leu Phe Asn
785                 790                 795                 800

Ile Pro Phe Asp Cys Trp Lys Pro Val Lys Lys His His His His His
                805                 810                 815

His

<210> SEQ ID NO 2
<211> LENGTH: 817
<212> TYPE: PRT
<213> ORGANISM: Artificial Sequence
<220> FEATURE:
<221> NAME/KEY: SIGNAL
<222> LOCATION: (1)..(817)
<223> OTHER INFORMATION: Fusion protein

<400> SEQUENCE: 2

Ile Trp Glu Leu Glu Lys Asp Val Tyr Val Val Glu Leu Asp Trp His
1               5                   10                  15

Pro Asp Ala Pro Gly Glu Met Val Val Leu Thr Cys Thr Pro Glu
                20                  25                  30

Glu Asp Asp Ile Thr Trp Thr Ser Ala Gln Ser Ser Glu Val Leu Gly
            35                  40                  45

Ser Gly Lys Thr Leu Thr Ile Gln Val Lys Glu Phe Gly Asp Ala Gly
    50                  55                  60

Gln Tyr Thr Cys His Lys Gly Gly Lys Val Leu Ser Arg Ser Leu Leu
65                  70                  75                  80

Leu Ile His Lys Lys Glu Asp Gly Ile Trp Ser Thr Asp Ile Leu Lys
                85                  90                  95

Glu Gln Lys Glu Ser Lys Asn Lys Ile Phe Leu Lys Cys Glu Ala Lys
            100                 105                 110

Asn Tyr Ser Gly Arg Phe Thr Cys Trp Trp Leu Thr Ala Ile Ser Thr
        115                 120                 125

Asp Leu Lys Phe Ser Val Lys Ser Ser Arg Gly Phe Ser Asp Pro Gln
```

-continued

```
            130                 135                 140
Gly Val Thr Cys Gly Ala Val Thr Leu Ser Ala Glu Arg Val Arg Val
145                 150                 155                 160

Asp Asn Arg Asp Tyr Lys Lys Tyr Thr Val Glu Cys Gln Glu Gly Ser
                165                 170                 175

Ala Cys Pro Ser Ala Glu Glu Ser Leu Pro Ile Glu Val Val Val Asp
                180                 185                 190

Ala Ile His Lys Leu Lys Tyr Glu Asn Tyr Thr Ser Ser Phe Phe Ile
                195                 200                 205

Arg Asp Ile Ile Lys Pro Asp Pro Thr Asn Leu Gln Leu Lys Pro
210                 215                 220

Leu Lys Asn Ser Arg His Val Glu Val Ser Trp Glu Tyr Pro Asp Thr
225                 230                 235                 240

Trp Ser Thr Pro His Ser Tyr Phe Ser Leu Thr Phe Cys Val Gln Ala
                245                 250                 255

Gln Gly Lys Asn Asn Arg Glu Lys Lys Asp Arg Leu Cys Val Asp Lys
                260                 265                 270

Thr Ser Ala Lys Val Val Cys His Lys Asp Ala Lys Ile Arg Val Gln
                275                 280                 285

Ala Arg Asp Arg Tyr Tyr Ser Ser Trp Ser Asp Trp Ala Ser Val
290                 295                 300

Ser Cys Ser Gly Gly Gly Ser Gly Gly Gly Ser Gly Gly Gly
305                 310                 315                 320

Gly Ser Arg Ser Leu Pro Thr Ala Ser Pro Ser Pro Gly Ile Phe Gln
                325                 330                 335

Cys Leu Asn His Ser Gln Asn Leu Leu Arg Ala Val Ser Asn Thr Leu
                340                 345                 350

Gln Lys Ala Arg Gln Thr Leu Glu Leu Tyr Ser Cys Thr Ser Glu Glu
                355                 360                 365

Ile Asp His Glu Asp Ile Thr Lys Asp Lys Thr Ser Thr Val Glu Ala
                370                 375                 380

Cys Leu Pro Leu Glu Leu Thr Met Asn Glu Ser Cys Leu Ala Ser Arg
385                 390                 395                 400

Glu Ile Ser Leu Ile Thr Asn Gly Ser Cys Leu Ala Ser Gly Lys Ala
                405                 410                 415

Ser Phe Met Thr Val Leu Cys Leu Ser Ser Ile Tyr Glu Asp Leu Lys
                420                 425                 430

Met Tyr Gln Met Glu Phe Lys Ala Met Asn Ala Lys Leu Leu Met Asp
                435                 440                 445

Pro Lys Arg Gln Ile Phe Leu Asp Gln Asn Met Leu Thr Ala Ile Asp
                450                 455                 460

Glu Leu Leu Gln Ala Leu Asn Phe Asn Ser Val Thr Val Pro Gln Lys
465                 470                 475                 480

Ser Ser Leu Glu Glu Pro Asp Phe Tyr Lys Thr Lys Ile Lys Leu Cys
                485                 490                 495

Ile Leu Leu His Ala Phe Arg Ile Arg Ala Val Thr Ile Asp Arg Met
                500                 505                 510

Met Ser Tyr Leu Asn Ser Ser Gly Gly Gly Ser Gly Gly Gly Gly
                515                 520                 525

Ser Gly Gly Gly Gly Ser Ala Pro Thr Arg Ser Pro Thr Leu Val Thr
                530                 535                 540

Arg Pro Ser Gln His Val Asp Ala Ile Gln Glu Ala Leu Ser Leu Leu
545                 550                 555                 560
```

```
Asn Asn Ser Asn Asp Val Thr Ala Val Met Asn Lys Ala Val Lys Val
                565                 570                 575

Val Ser Glu Val Phe Asp Pro Glu Gly Pro Thr Cys Leu Glu Thr Arg
            580                 585                 590

Leu Gln Leu Tyr Lys Glu Gly Leu Gln Gly Ser Leu Thr Ser Leu Lys
        595                 600                 605

Asn Pro Leu Thr Met Met Ala Asn His Tyr Lys Gln His Cys Pro Pro
    610                 615                 620

Thr Pro Glu Ser Pro Cys Ala Thr Gln Asn Ile Asn Phe Lys Ser Phe
625                 630                 635                 640

Lys Glu Asn Leu Lys Asp Phe Leu Phe Asn Ile Pro Phe Asp Cys Trp
                645                 650                 655

Lys Pro Val Lys Lys Gly Gly Gly Ser Gly Gly Gly Ser Gly
            660                 665                 670

Gly Gly Gly Ser Ala Pro Ile Thr Ser Ser Thr Lys Glu Thr Glu
        675                 680                 685

Gln Gln Met Glu Gln Leu Leu Leu Asp Leu Gln Leu Leu Leu Asn Gly
    690                 695                 700

Val Asn Asn Tyr Glu Asn Pro Gln Leu Ser Arg Met Leu Thr Phe Lys
705                 710                 715                 720

Phe Tyr Thr Pro Lys Lys Ala Thr Glu Phe Thr His Leu Gln Cys Leu
                725                 730                 735

Ala Glu Glu Leu Lys Asn Leu Glu Gly Val Leu Gly Leu Pro Gln Ser
            740                 745                 750

Lys Asn Val His Leu Thr Asp Thr Lys Glu Leu Ile Ser Asn Met Asn
        755                 760                 765

Val Thr Leu Leu Lys Leu Lys Gly Ser Glu Thr Ser Tyr Asn Cys Glu
    770                 775                 780

Tyr Asp Asp Glu Thr Ala Thr Ile Thr Glu Phe Leu Asn Lys Trp Ile
785                 790                 795                 800

Thr Phe Cys Gln Ser Ile Phe Ser Thr Leu Thr His His His His His
                805                 810                 815

His

<210> SEQ ID NO 3
<211> LENGTH: 816
<212> TYPE: PRT
<213> ORGANISM: Artificial Sequence
<220> FEATURE:
<221> NAME/KEY: SIGNAL
<222> LOCATION: (1)..(816)
<223> OTHER INFORMATION: Fusion protein

<400> SEQUENCE: 3

Ile Trp Glu Leu Glu Lys Asn Val Tyr Val Val Glu Leu Asp Trp His
1               5                   10                  15

Pro Asp Ala Pro Gly Glu Met Val Val Leu Thr Cys Asn Thr Pro Glu
            20                  25                  30

Glu Asp Asp Ile Thr Trp Thr Ser Asp Gln Ser Ser Glu Val Leu Gly
        35                  40                  45

Ser Gly Lys Thr Leu Thr Ile Gln Val Lys Glu Phe Ala Asp Ala Gly
    50                  55                  60

Gln Tyr Thr Cys His Lys Gly Gly Glu Val Leu Ser His Ser Phe Leu
65                  70                  75                  80

Leu Ile His Lys Lys Glu Asp Gly Ile Trp Ser Thr Asp Ile Leu Arg
```

```
                           85                  90                  95
Glu Gln Lys Glu Ser Lys Asn Lys Ile Phe Leu Lys Cys Glu Ala Lys
            100                 105                 110

Asn Tyr Ser Gly Arg Phe Thr Cys Trp Trp Leu Thr Ala Ile Ser Thr
            115                 120                 125

Asp Leu Lys Phe Thr Val Lys Ser Ser Arg Gly Ser Ser Asp Pro Gln
    130                 135                 140

Glu Val Thr Cys Gly Ala Ala Thr Leu Ser Ala Glu Lys Val Arg Val
145                 150                 155                 160

Asp Asn Arg Asp Tyr Lys Lys Tyr Thr Val Glu Cys Gln Glu Gly Ser
                165                 170                 175

Ala Cys Pro Ala Ala Glu Glu Ser Leu Pro Ile Glu Val Val Val Asp
            180                 185                 190

Ala Ile His Lys Leu Lys Tyr Glu Asn Tyr Thr Ser Ser Phe Phe Ile
            195                 200                 205

Arg Asp Ile Ile Lys Pro Asp Pro Pro Lys Asn Leu Gln Leu Lys Pro
    210                 215                 220

Leu Lys Asn Ser Arg His Val Glu Val Ser Trp Glu Tyr Pro Asp Thr
225                 230                 235                 240

Trp Ser Thr Pro His Ser Tyr Phe Ser Leu Thr Phe Gly Val Gln Val
                245                 250                 255

Gln Gly Lys Asn Asn Arg Glu Lys Lys Asp Arg Leu Ser Val Asp Lys
            260                 265                 270

Thr Ser Ala Lys Val Val Cys His Lys Asp Ala Lys Ile Arg Val Gln
    275                 280                 285

Ala Arg Asp Arg Tyr Tyr Ser Ser Ser Trp Ser Asn Trp Ala Ser Val
    290                 295                 300

Ser Cys Ser Gly Gly Gly Ser Gly Gly Gly Ser Gly Gly Gly Gly
305                 310                 315                 320

Gly Ser Arg Asn Leu Pro Thr Pro Thr Pro Ser Pro Gly Met Phe Gln
            325                 330                 335

Cys Leu Asn His Ser Gln Thr Leu Leu Arg Ala Ile Ser Asn Thr Leu
            340                 345                 350

Gln Lys Ala Arg Gln Thr Leu Glu Phe Tyr Pro Cys Thr Ser Glu Glu
    355                 360                 365

Ile Asp His Glu Asp Ile Thr Lys Asp Lys Thr Ser Thr Val Glu Ala
    370                 375                 380

Cys Leu Pro Leu Glu Leu Thr Met Asn Glu Ser Cys Leu Ala Ser Arg
385                 390                 395                 400

Glu Ile Ser Leu Ile Thr Asn Gly Ser Cys Leu Ala Ser Arg Lys Thr
                405                 410                 415

Ser Phe Met Thr Thr Leu Cys Leu Ser Ser Ile Tyr Glu Asp Leu Lys
            420                 425                 430

Met Tyr Gln Val Glu Phe Lys Ala Met Asn Ala Lys Leu Leu Met Asp
            435                 440                 445

Pro Lys Arg Gln Ile Phe Leu Asp Gln Asn Met Leu Thr Ala Ile Asp
    450                 455                 460

Glu Leu Leu Gln Ala Leu Asn Val Asn Ser Val Thr Val Pro Gln Asn
465                 470                 475                 480

Ser Ser Leu Glu Glu Pro Asp Phe Tyr Lys Thr Lys Ile Lys Leu Cys
                485                 490                 495

Ile Leu Leu His Ala Phe Arg Ile Arg Ala Val Thr Ile Asn Arg Met
            500                 505                 510
```

Met Ser Tyr Leu Asn Ser Ser Gly Gly Gly Ser Gly Gly Gly
        515                 520                 525

Ser Gly Gly Gly Ser Ala Pro Ala Ser Ser Thr Lys Glu Thr
    530                 535                 540

Gln Gln Gln Leu Glu Gln Leu Leu Asp Leu Arg Leu Leu Asn
545                 550                 555                 560

Gly Val Asn Asn Pro Glu Asn Pro Lys Leu Ser Arg Met Leu Thr Phe
                565                 570                 575

Lys Phe Tyr Val Pro Lys Lys Ala Thr Glu Leu Thr His Leu Gln Cys
            580                 585                 590

Leu Val Glu Glu Leu Lys Pro Leu Glu Glu Val Leu Tyr Leu Ala Gln
        595                 600                 605

Ser Lys Asn Phe His Leu Asn His Ile Lys Glu Leu Met Ser Asn Ile
    610                 615                 620

Asn Val Thr Val Leu Lys Leu Lys Gly Ser Glu Thr Arg Phe Thr Cys
625                 630                 635                 640

Asn Tyr Asp Asp Glu Thr Ala Thr Ile Val Glu Phe Leu Asn Lys Trp
                645                 650                 655

Ile Thr Phe Cys Gln Ser Ile Phe Ser Thr Leu Thr Gly Gly Gly Gly
            660                 665                 670

Ser Gly Gly Gly Gly Ser Gly Gly Gly Ser Ala Pro Thr Ser Ser
    675                 680                 685

Pro Ser Ser Val Thr Arg Pro Trp Gln His Val Asp Ala Met Lys Glu
690                 695                 700

Ala Leu Ser Leu Leu Asn Ser Ser Glu Ile Thr Ala Val Met Asn
705                 710                 715                 720

Glu Thr Val Glu Val Val Ser Glu Met Phe Asp Pro Glu Glu Pro Lys
                725                 730                 735

Cys Leu Gln Thr His Leu Lys Leu Tyr Glu Gln Gly Leu Arg Gly Ser
            740                 745                 750

Leu Ile Ser Leu Lys Glu Pro Leu Arg Met Met Ala Asn His Tyr Lys
        755                 760                 765

Gln His Cys Pro Leu Thr Pro Glu Thr Pro Cys Glu Thr Gln Thr Ile
    770                 775                 780

Thr Phe Lys Asn Phe Lys Glu Lys Leu Lys Asp Phe Leu Phe Asn Asn
785                 790                 795                 800

Pro Phe Asp Cys Trp Gly Pro Asp Gln Lys His His His His His
                805                 810                 815

<210> SEQ ID NO 4
<211> LENGTH: 816
<212> TYPE: PRT
<213> ORGANISM: Artificial Sequence
<220> FEATURE:
<221> NAME/KEY: SIGNAL
<222> LOCATION: (1)..(816)
<223> OTHER INFORMATION: Fusion protein

<400> SEQUENCE: 4

Ile Trp Glu Leu Glu Lys Asn Val Tyr Val Val Glu Leu Asp Trp His
1               5                   10                  15

Pro Asp Ala Pro Gly Glu Met Val Val Leu Thr Cys Asn Thr Pro Glu
            20                  25                  30

Glu Asp Asp Ile Thr Trp Thr Ser Asp Gln Ser Ser Glu Val Leu Gly
        35                  40                  45

```
Ser Gly Lys Thr Leu Thr Ile Gln Val Lys Glu Phe Ala Asp Ala Gly
    50              55                  60

Gln Tyr Thr Cys His Lys Gly Glu Val Leu Ser His Ser Phe Leu
65              70              75                  80

Leu Ile His Lys Lys Glu Asp Gly Ile Trp Ser Thr Asp Ile Leu Arg
            85              90                  95

Glu Gln Lys Glu Ser Lys Asn Lys Ile Phe Leu Lys Cys Glu Ala Lys
            100             105             110

Asn Tyr Ser Gly Arg Phe Thr Cys Trp Trp Leu Thr Ala Ile Ser Thr
            115             120             125

Asp Leu Lys Phe Thr Val Lys Ser Ser Arg Gly Ser Ser Asp Pro Gln
130             135             140

Glu Val Thr Cys Gly Ala Ala Thr Leu Ser Ala Glu Lys Val Arg Val
145             150             155             160

Asp Asn Arg Asp Tyr Lys Lys Tyr Thr Val Glu Cys Gln Glu Gly Ser
                165             170             175

Ala Cys Pro Ala Ala Glu Glu Ser Leu Pro Ile Glu Val Val Val Asp
            180             185             190

Ala Ile His Lys Leu Lys Tyr Glu Asn Tyr Thr Ser Ser Phe Phe Ile
            195             200             205

Arg Asp Ile Ile Lys Pro Asp Pro Pro Lys Asn Leu Gln Leu Lys Pro
210             215             220

Leu Lys Asn Ser Arg His Val Glu Val Ser Trp Glu Tyr Pro Asp Thr
225             230             235             240

Trp Ser Thr Pro His Ser Tyr Phe Ser Leu Thr Phe Gly Val Gln Val
            245             250             255

Gln Gly Lys Asn Asn Arg Glu Lys Lys Asp Arg Leu Ser Val Asp Lys
            260             265             270

Thr Ser Ala Lys Val Val Cys His Lys Asp Ala Lys Ile Arg Val Gln
            275             280             285

Ala Arg Asp Arg Tyr Tyr Ser Ser Ser Trp Ser Asn Trp Ala Ser Val
            290             295             300

Ser Cys Ser Gly Gly Gly Gly Ser Gly Gly Gly Ser Gly Gly Gly
305             310             315             320

Gly Ser Arg Asn Leu Pro Thr Pro Thr Pro Ser Pro Gly Met Phe Gln
            325             330             335

Cys Leu Asn His Ser Gln Thr Leu Leu Arg Ala Ile Ser Asn Thr Leu
            340             345             350

Gln Lys Ala Arg Gln Thr Leu Glu Phe Tyr Pro Cys Thr Ser Glu Glu
            355             360             365

Ile Asp His Glu Asp Ile Thr Lys Asp Lys Thr Ser Thr Val Glu Ala
            370             375             380

Cys Leu Pro Leu Glu Leu Thr Met Asn Glu Ser Cys Leu Ala Ser Arg
385             390             395             400

Glu Ile Ser Leu Ile Thr Asn Gly Ser Cys Leu Ala Ser Arg Lys Thr
            405             410             415

Ser Phe Met Thr Thr Leu Cys Leu Ser Ser Ile Tyr Glu Asp Leu Lys
            420             425             430

Met Tyr Gln Val Glu Phe Lys Ala Met Asn Ala Lys Leu Leu Met Asp
            435             440             445

Pro Lys Arg Gln Ile Phe Leu Asp Gln Asn Met Leu Thr Ala Ile Asp
450             455             460

Glu Leu Leu Gln Ala Leu Asn Val Asn Ser Val Thr Val Pro Gln Asn
```

```
                465                 470                 475                 480
        Ser Ser Leu Glu Glu Pro Asp Phe Tyr Lys Thr Lys Ile Lys Leu Cys
                        485                 490                 495

Ile Leu Leu His Ala Phe Arg Ile Arg Ala Val Thr Ile Asn Arg Met
                        500                 505                 510

Met Ser Tyr Leu Asn Ser Ser Gly Gly Gly Ser Gly Gly Gly Gly
                        515                 520                 525

Ser Gly Gly Gly Gly Ser Ala Pro Thr Ser Pro Ser Ser Val Thr
        530                 535                 540

Arg Pro Trp Gln His Val Asp Ala Met Lys Glu Ala Leu Ser Leu Leu
        545                 550                 555                 560

Asn Asn Ser Ser Glu Ile Thr Ala Val Met Asn Glu Thr Val Glu Val
                        565                 570                 575

Val Ser Glu Met Phe Asp Pro Glu Glu Pro Lys Cys Leu Gln Thr His
                        580                 585                 590

Leu Lys Leu Tyr Glu Gln Gly Leu Arg Gly Ser Leu Ile Ser Leu Lys
                        595                 600                 605

Glu Pro Leu Arg Met Met Ala Asn His Tyr Lys Gln His Cys Pro Leu
                610                 615                 620

Thr Pro Glu Thr Pro Cys Glu Thr Gln Thr Ile Thr Phe Lys Asn Phe
        625                 630                 635                 640

Lys Glu Lys Leu Lys Asp Phe Leu Phe Asn Asn Pro Phe Asp Cys Trp
                        645                 650                 655

Gly Pro Asp Gln Lys Gly Gly Gly Ser Gly Gly Gly Ser Gly
                        660                 665                 670

Gly Gly Gly Ser Ala Pro Ala Ser Ser Ser Thr Lys Glu Thr Gln Gln
                        675                 680                 685

Gln Leu Glu Gln Leu Leu Leu Asp Leu Arg Leu Leu Asn Gly Val
                        690                 695                 700

Asn Asn Pro Glu Asn Pro Lys Leu Ser Arg Met Leu Thr Phe Lys Phe
        705                 710                 715                 720

Tyr Val Pro Lys Lys Ala Thr Glu Leu Thr His Leu Gln Cys Leu Val
                        725                 730                 735

Glu Glu Leu Lys Pro Leu Glu Glu Val Leu Tyr Leu Ala Gln Ser Lys
                        740                 745                 750

Asn Phe His Leu Asn His Ile Lys Glu Leu Met Ser Asn Ile Asn Val
                        755                 760                 765

Thr Val Leu Lys Leu Lys Gly Ser Glu Thr Arg Phe Thr Cys Asn Tyr
        770                 775                 780

Asp Asp Glu Thr Ala Thr Ile Val Glu Phe Leu Asn Lys Trp Ile Thr
        785                 790                 795                 800

Phe Cys Gln Ser Ile Phe Ser Thr Leu Thr His His His His His
                        805                 810                 815

<210> SEQ ID NO 5
<211> LENGTH: 1309
<212> TYPE: PRT
<213> ORGANISM: Artificial Sequence
<220> FEATURE:
<221> NAME/KEY: SIGNAL
<222> LOCATION: (1)..(1309)
<223> OTHER INFORMATION: Fusion protein

<400> SEQUENCE: 5

Ile Trp Glu Leu Glu Lys Asp Val Tyr Val Val Glu Leu Asp Trp His
1               5                   10                  15
```

```
Pro Asp Ala Pro Gly Glu Met Val Val Leu Thr Cys His Thr Pro Glu
            20                  25                  30

Glu Asp Asp Ile Thr Trp Thr Ser Ala Gln Ser Ser Glu Val Leu Gly
            35                  40                  45

Ser Gly Lys Thr Leu Thr Ile Gln Val Lys Glu Phe Gly Asp Ala Gly
 50                  55                  60

Gln Tyr Thr Cys His Lys Gly Lys Val Leu Ser Arg Ser Leu Leu
 65              70                  75                  80

Leu Ile His Lys Lys Glu Asp Gly Ile Trp Ser Thr Asp Ile Leu Lys
                 85                  90                  95

Glu Gln Lys Glu Ser Lys Asn Lys Ile Phe Leu Lys Cys Glu Ala Lys
            100                 105                 110

Asn Tyr Ser Gly Arg Phe Thr Cys Trp Trp Leu Thr Ala Ile Ser Thr
            115                 120                 125

Asp Leu Lys Phe Ser Val Lys Ser Ser Arg Gly Phe Ser Asp Pro Gln
130                 135                 140

Gly Val Thr Cys Gly Ala Val Thr Leu Ser Ala Glu Arg Val Arg Val
145                 150                 155                 160

Asp Asn Arg Asp Tyr Lys Lys Tyr Thr Val Glu Cys Gln Glu Gly Ser
                165                 170                 175

Ala Cys Pro Ser Ala Glu Glu Ser Leu Pro Ile Glu Val Val Val Asp
            180                 185                 190

Ala Ile His Lys Leu Lys Tyr Glu Asn Tyr Thr Ser Ser Phe Phe Ile
            195                 200                 205

Arg Asp Ile Ile Lys Pro Asp Pro Pro Thr Asn Leu Gln Leu Lys Pro
210                 215                 220

Leu Lys Asn Ser Arg His Val Glu Val Ser Trp Glu Tyr Pro Asp Thr
225                 230                 235                 240

Trp Ser Thr Pro His Ser Tyr Phe Ser Leu Thr Phe Cys Val Gln Ala
                245                 250                 255

Gln Gly Lys Asn Asn Arg Glu Lys Lys Asp Arg Leu Cys Val Asp Lys
            260                 265                 270

Thr Ser Ala Lys Val Val Cys His Lys Asp Ala Lys Ile Arg Val Gln
            275                 280                 285

Ala Arg Asp Arg Tyr Tyr Ser Ser Ser Trp Ser Asp Trp Ala Ser Val
            290                 295                 300

Ser Cys Ser Gly Gly Gly Ser Gly Gly Gly Ser Gly Gly Gly
305                 310                 315                 320

Gly Ser Arg Ser Leu Pro Thr Ala Ser Pro Ser Pro Gly Ile Phe Gln
                325                 330                 335

Cys Leu Asn His Ser Gln Asn Leu Leu Arg Ala Val Ser Asn Thr Leu
            340                 345                 350

Gln Lys Ala Arg Gln Thr Leu Glu Leu Tyr Ser Cys Thr Ser Glu Glu
            355                 360                 365

Ile Asp His Glu Asp Ile Thr Lys Asp Lys Thr Ser Thr Val Glu Ala
            370                 375                 380

Cys Leu Pro Leu Glu Leu Thr Met Asn Glu Ser Cys Leu Ala Ser Arg
385                 390                 395                 400

Glu Ile Ser Leu Ile Thr Asn Gly Ser Cys Leu Ala Ser Gly Lys Ala
                405                 410                 415

Ser Phe Met Thr Val Leu Cys Leu Ser Ser Ile Tyr Glu Asp Leu Lys
            420                 425                 430
```

```
Met Tyr Gln Met Glu Phe Lys Ala Met Asn Ala Lys Leu Leu Met Asp
            435                 440                 445

Pro Lys Arg Gln Ile Phe Leu Asp Gln Asn Met Leu Thr Ala Ile Asp
450                 455                 460

Glu Leu Leu Gln Ala Leu Asn Phe Asn Ser Val Thr Val Pro Gln Lys
465                 470                 475                 480

Ser Ser Leu Glu Glu Pro Asp Phe Tyr Lys Thr Lys Ile Lys Leu Cys
                485                 490                 495

Ile Leu Leu His Ala Phe Arg Ile Arg Ala Val Thr Ile Asp Arg Met
                500                 505                 510

Met Ser Tyr Leu Asn Ser Ser Gly Gly Gly Ser Gly Gly Gly Gly
            515                 520                 525

Ser Gly Gly Gly Gly Ser Ala Pro Ile Thr Ser Ser Thr Lys Glu
    530                 535                 540

Thr Glu Gln Gln Met Glu Gln Leu Leu Leu Asp Leu Gln Leu Leu Leu
545                 550                 555                 560

Asn Gly Val Asn Asn Tyr Glu Asn Pro Gln Leu Ser Arg Met Leu Thr
                565                 570                 575

Phe Lys Phe Tyr Thr Pro Lys Lys Ala Thr Glu Phe Thr His Leu Gln
            580                 585                 590

Cys Leu Ala Glu Glu Leu Lys Asn Leu Glu Glu Val Leu Gly Leu Pro
            595                 600                 605

Gln Ser Lys Asn Val His Leu Thr Asp Thr Lys Glu Leu Ile Ser Asn
            610                 615                 620

Met Asn Val Thr Leu Leu Lys Leu Lys Gly Ser Glu Thr Ser Tyr Asn
625                 630                 635                 640

Cys Glu Tyr Asp Asp Glu Thr Ala Thr Ile Thr Glu Phe Leu Asn Lys
                645                 650                 655

Trp Ile Thr Phe Cys Gln Ser Ile Phe Ser Thr Leu Thr Gly Gly Gly
                660                 665                 670

Gly Ser Leu Val Pro Arg Gly Ser Gly Gly Gly Ser Gln Val Gln
            675                 680                 685

Leu Gln Glu Ser Gly Pro Gly Leu Val Lys Pro Ser Glu Thr Leu Ser
690                 695                 700

Leu Thr Cys Ala Val Ser Gly Tyr Ser Ile Ser Ser Gly Tyr Tyr Trp
705                 710                 715                 720

Gly Trp Ile Arg Gln Pro Pro Gly Lys Gly Leu Glu Trp Ile Gly Ser
                725                 730                 735

Ile Tyr His Ser Gly Ser Thr Tyr Tyr Asn Pro Ser Leu Lys Ser Arg
            740                 745                 750

Val Thr Ile Ser Val Asp Thr Ser Lys Asn Gln Phe Ser Leu Lys Leu
            755                 760                 765

Ser Ser Val Thr Ala Ala Asp Thr Ala Val Tyr Tyr Cys Ala Arg Gly
770                 775                 780

Lys Trp Ser Lys Phe Asp Tyr Trp Gly Gln Gly Thr Leu Val Thr Val
785                 790                 795                 800

Ser Ser Gly Gly Ser Gly Gly Glu Ile Val Leu Thr Gln Ser Pro Gly
                805                 810                 815

Thr Leu Ser Leu Ser Pro Gly Glu Arg Ala Thr Leu Ser Cys Arg Ala
            820                 825                 830

Ser Gln Ser Val Ser Met Pro Phe Leu Ala Trp Tyr Gln Gln Lys Pro
            835                 840                 845

Gly Gln Ala Pro Arg Leu Leu Ile Tyr Gly Ala Ser Ser Arg Ala Thr
```

```
              850            855            860

Gly Ile Pro Asp Arg Phe Ser Gly Ser Gly Ser Gly Thr Asp Phe Thr
865                 870            875                 880

Leu Thr Ile Ser Arg Leu Glu Pro Glu Asp Phe Ala Val Tyr Tyr Cys
                885                 890                 895

Gln Gln Met Arg Gly Arg Pro Pro Thr Phe Gly Gln Gly Thr Lys Val
            900                 905                 910

Glu Ile Lys Ser Ser Ser Gly Ser Ser Ser Gly Ser Ser Ser
            915                 920                 925

Ser Gly Glu Val Gln Leu Leu Glu Ser Gly Gly Gly Leu Val Gln Pro
    930                 935                 940

Gly Gly Ser Leu Arg Leu Ser Cys Ala Ala Ser Gly Phe Thr Phe Ser
945                 950                 955                 960

Leu Phe Thr Met Ser Trp Val Arg Gln Ala Pro Gly Lys Gly Leu Glu
                965                 970                 975

Trp Val Ser Ala Ile Ser Gly Ser Gly Gly Ser Thr Tyr Tyr Ala Asp
                980                 985                 990

Ser Val Lys Gly Arg Phe Thr Ile Ser Arg Asp Asn Ser Lys Asn Thr
            995                 1000                1005

Leu Tyr Leu Gln Met Asn Ser Leu Arg Ala Glu Asp Thr Ala Val Tyr
    1010                1015                1020

Tyr Cys Ala Lys Ser Thr His Leu Tyr Leu Phe Asp Tyr Trp Gly Gln
1025                1030                1035                1040

Gly Thr Leu Val Thr Val Ser Ser Gly Gly Ser Gly Gly Ser Ser Glu
                1045                1050                1055

Leu Thr Gln Asp Pro Ala Val Ser Val Ala Leu Gly Gln Thr Val Arg
    1060                1065                1070

Ile Thr Cys Gln Gly Asp Ser Leu Arg Ser Tyr Tyr Ala Ser Trp Tyr
        1075                1080                1085

Gln Gln Lys Pro Gly Gln Ala Pro Val Leu Val Ile Tyr Gly Lys Asn
    1090                1095                1100

Asn Arg Pro Ser Gly Ile Pro Asp Arg Phe Ser Gly Ser Ser Ser Gly
1105                1110                1115                1120

Asn Thr Ala Ser Leu Thr Ile Thr Gly Ala Gln Ala Glu Asp Glu Ala
        1125                1130                1135

Asp Tyr Tyr Cys Asn Ser Arg Asp Ser Ser Gly Asn His Val Val Phe
        1140                1145                1150

Gly Gly Gly Thr Lys Leu Thr Val Leu Ser Ser Ser Gly Leu Val
        1155                1160                1165

Pro Arg Gly Ser Ser Ser Gly Ala Pro Thr Arg Ser Pro Thr Leu
    1170                1175                1180

Val Thr Arg Pro Ser Gln His Val Asp Ala Ile Gln Glu Ala Leu Ser
1185                1190                1195                1200

Leu Leu Asn Asn Ser Asn Asp Val Thr Ala Val Met Asn Lys Ala Val
                1205                1210                1215

Lys Val Val Ser Glu Val Phe Asp Pro Glu Gly Pro Thr Cys Leu Glu
            1220                1225                1230

Thr Arg Leu Gln Leu Tyr Lys Glu Gly Leu Gln Gly Ser Leu Thr Ser
        1235                1240                1245

Leu Lys Asn Pro Leu Thr Met Met Ala Asn His Tyr Lys Gln His Cys
    1250                1255                1260

Pro Pro Thr Pro Glu Ser Pro Cys Ala Thr Gln Asn Ile Asn Phe Lys
1265                1270                1275                1280
```

```
Ser Phe Lys Glu Asn  Leu Lys Asp Phe Leu  Phe Asn Ile Pro Phe  Asp
            1285                 1290                 1295

Cys Trp Lys Pro  Val Lys Lys His  His  His His His His
        1300                 1305

<210> SEQ ID NO 6
<211> LENGTH: 1308
<212> TYPE: PRT
<213> ORGANISM: Artificial Sequence
<220> FEATURE:
<221> NAME/KEY: SIGNAL
<222> LOCATION: (1)..(1308)
<223> OTHER INFORMATION: Fusion protein

<400> SEQUENCE: 6

Ile Trp Glu Leu Glu  Lys Asn Val Tyr Val  Glu Leu Asp Trp His
1               5                   10                  15

Pro Asp Ala Pro Gly  Glu Met Val Val Leu  Thr Cys Asn Thr Pro Glu
                20                  25                  30

Glu Asp Asp Ile Thr  Trp Thr Ser Asp Gln  Ser Ser Glu Val Leu Gly
                35                  40                  45

Ser Gly Lys Thr Leu  Thr Ile Gln Val Lys  Glu Phe Ala Asp Ala Gly
        50                  55                  60

Gln Tyr Thr Cys His  Lys Gly Gly Glu Val  Leu Ser His Ser Phe Leu
65              70                  75                          80

Leu Ile His Lys Lys  Glu Asp Gly Ile Trp  Ser Thr Asp Ile Leu Arg
                85                  90                  95

Glu Gln Lys Glu Ser  Lys Asn Lys Ile Phe  Leu Lys Cys Glu Ala Lys
                100                 105                 110

Asn Tyr Ser Gly Arg  Phe Thr Cys Trp Trp  Leu Thr Ala Ile Ser Thr
            115                 120                 125

Asp Leu Lys Phe Thr  Val Lys Ser Ser Arg  Gly Ser Ser Asp Pro Gln
            130                 135                 140

Glu Val Thr Cys Gly  Ala Ala Thr Leu Ser  Ala Glu Lys Val Arg Val
145             150                 155                         160

Asp Asn Arg Asp Tyr  Lys Lys Tyr Thr Val  Glu Cys Gln Glu Gly Ser
                165                 170                 175

Ala Cys Pro Ala Ala  Glu Glu Ser Leu Pro  Ile Glu Val Val Val Asp
                180                 185                 190

Ala Ile His Lys Leu  Lys Tyr Glu Asn Tyr  Thr Ser Ser Phe Phe Ile
            195                 200                 205

Arg Asp Ile Ile Lys  Pro Asp Pro Pro Lys  Asn Leu Gln Leu Lys Pro
            210                 215                 220

Leu Lys Asn Ser Arg  His Val Glu Val Ser  Trp Glu Tyr Pro Asp Thr
225             230                 235                         240

Trp Ser Thr Pro His  Ser Tyr Phe Ser Leu  Thr Phe Gly Val Gln Val
                245                 250                 255

Gln Gly Lys Asn Asn  Arg Glu Lys Lys Asp  Arg Leu Ser Val Asp Lys
                260                 265                 270

Thr Ser Ala Lys Val  Val Cys His Lys Asp  Ala Lys Ile Arg Val Gln
            275                 280                 285

Ala Arg Asp Arg Tyr  Tyr Ser Ser Ser Trp  Ser Asn Trp Ala Ser Val
            290                 295                 300

Ser Cys Ser Gly Gly  Gly Gly Ser Gly Gly  Gly Gly Ser Gly Gly Gly
305             310                 315                         320
```

-continued

```
Gly Ser Arg Asn Leu Pro Thr Pro Thr Pro Ser Pro Gly Met Phe Gln
                325                 330                 335

Cys Leu Asn His Ser Gln Thr Leu Leu Arg Ala Ile Ser Asn Thr Leu
            340                 345                 350

Gln Lys Ala Arg Gln Thr Leu Glu Phe Tyr Pro Cys Thr Ser Glu Glu
        355                 360                 365

Ile Asp His Glu Asp Ile Thr Lys Asp Lys Thr Ser Thr Val Glu Ala
    370                 375                 380

Cys Leu Pro Leu Glu Leu Thr Met Asn Glu Ser Cys Leu Ala Ser Arg
385                 390                 395                 400

Glu Ile Ser Leu Ile Thr Asn Gly Ser Cys Leu Ala Ser Arg Lys Thr
                405                 410                 415

Ser Phe Met Thr Thr Leu Cys Leu Ser Ser Ile Tyr Glu Asp Leu Lys
            420                 425                 430

Met Tyr Gln Val Glu Phe Lys Ala Met Asn Ala Lys Leu Leu Met Asp
        435                 440                 445

Pro Lys Arg Gln Ile Phe Leu Asp Gln Asn Met Leu Thr Ala Ile Asp
    450                 455                 460

Glu Leu Leu Gln Ala Leu Asn Val Asn Ser Val Thr Val Pro Gln Asn
465                 470                 475                 480

Ser Ser Leu Glu Glu Pro Asp Phe Tyr Lys Thr Lys Ile Lys Leu Cys
                485                 490                 495

Ile Leu Leu His Ala Phe Arg Ile Arg Ala Val Thr Ile Asn Arg Met
            500                 505                 510

Met Ser Tyr Leu Asn Ser Ser Gly Gly Gly Ser Gly Gly Gly Gly
        515                 520                 525

Ser Gly Gly Gly Gly Ser Ala Pro Ala Ser Ser Thr Lys Glu Thr
    530                 535                 540

Gln Gln Gln Leu Glu Gln Leu Leu Asp Leu Arg Leu Leu Leu Asn
545                 550                 555                 560

Gly Val Asn Asn Pro Glu Asn Pro Lys Leu Ser Arg Met Leu Thr Phe
                565                 570                 575

Lys Phe Tyr Val Pro Lys Lys Ala Thr Glu Leu Thr His Leu Gln Cys
            580                 585                 590

Leu Val Glu Glu Leu Lys Pro Leu Glu Glu Val Leu Tyr Leu Ala Gln
        595                 600                 605

Ser Lys Asn Phe His Leu Asn His Ile Lys Glu Leu Met Ser Asn Ile
    610                 615                 620

Asn Val Thr Val Leu Lys Leu Lys Gly Ser Glu Thr Arg Phe Thr Cys
625                 630                 635                 640

Asn Tyr Asp Asp Glu Thr Ala Thr Ile Val Glu Phe Leu Asn Lys Trp
                645                 650                 655

Ile Thr Phe Cys Gln Ser Ile Phe Ser Thr Leu Thr Gly Gly Gly Gly
            660                 665                 670

Ser Leu Val Pro Arg Gly Ser Gly Gly Gly Ser Gln Val Gln Leu
        675                 680                 685

Gln Glu Ser Gly Pro Gly Leu Val Lys Pro Ser Glu Thr Leu Ser Leu
    690                 695                 700

Thr Cys Ala Val Ser Gly Tyr Ser Ile Ser Gly Tyr Tyr Trp Gly
705                 710                 715                 720

Trp Ile Arg Gln Pro Pro Gly Lys Gly Leu Glu Trp Ile Gly Ser Ile
                725                 730                 735

Tyr His Ser Gly Ser Thr Tyr Tyr Asn Pro Ser Leu Lys Ser Arg Val
```

-continued

```
                740             745             750
Thr Ile Ser Val Asp Thr Ser Lys Asn Gln Phe Ser Leu Lys Leu Ser
            755             760             765

Ser Val Thr Ala Ala Asp Thr Ala Val Tyr Tyr Cys Ala Arg Gly Lys
        770             775             780

Trp Ser Lys Phe Asp Tyr Trp Gly Gln Gly Thr Leu Val Thr Val Ser
785             790             795             800

Ser Gly Gly Ser Gly Gly Glu Ile Val Leu Thr Gln Ser Pro Gly Thr
                805             810             815

Leu Ser Leu Ser Pro Gly Glu Arg Ala Thr Leu Ser Cys Arg Ala Ser
            820             825             830

Gln Ser Val Ser Met Pro Phe Leu Ala Trp Tyr Gln Gln Lys Pro Gly
        835             840             845

Gln Ala Pro Arg Leu Leu Ile Tyr Gly Ala Ser Ser Arg Ala Thr Gly
    850             855             860

Ile Pro Asp Arg Phe Ser Gly Ser Gly Ser Gly Thr Asp Phe Thr Leu
865             870             875             880

Thr Ile Ser Arg Leu Glu Pro Glu Asp Phe Ala Val Tyr Tyr Cys Gln
                885             890             895

Gln Met Arg Gly Arg Pro Pro Thr Phe Gly Gln Gly Thr Lys Val Glu
            900             905             910

Ile Lys Ser Ser Ser Gly Ser Ser Ser Gly Ser Ser Ser Ser
        915             920             925

Gly Glu Val Gln Leu Leu Glu Ser Gly Gly Gly Leu Val Gln Pro Gly
    930             935             940

Gly Ser Leu Arg Leu Ser Cys Ala Ala Ser Gly Phe Thr Phe Ser Leu
945             950             955             960

Phe Thr Met Ser Trp Val Arg Gln Ala Pro Gly Lys Gly Leu Glu Trp
                965             970             975

Val Ser Ala Ile Ser Gly Ser Gly Gly Ser Thr Tyr Tyr Ala Asp Ser
            980             985             990

Val Lys Gly Arg Phe Thr Ile Ser Arg Asp Asn Ser Lys Asn Thr Leu
        995             1000            1005

Tyr Leu Gln Met Asn Ser Leu Arg Ala Glu Asp Thr Ala Val Tyr Tyr
    1010            1015            1020

Cys Ala Lys Ser Thr His Leu Tyr Leu Phe Asp Tyr Trp Gly Gln Gly
1025            1030            1035            1040

Thr Leu Val Thr Val Ser Ser Gly Gly Ser Gly Gly Ser Ser Glu Leu
                1045            1050            1055

Thr Gln Asp Pro Ala Val Ser Val Ala Leu Gly Gln Thr Val Arg Ile
            1060            1065            1070

Thr Cys Gln Gly Asp Ser Leu Arg Ser Tyr Tyr Ala Ser Trp Tyr Gln
        1075            1080            1085

Gln Lys Pro Gly Gln Ala Pro Val Leu Val Ile Tyr Gly Lys Asn Asn
    1090            1095            1100

Arg Pro Ser Gly Ile Pro Asp Arg Phe Ser Gly Ser Ser Ser Gly Asn
1105            1110            1115            1120

Thr Ala Ser Leu Thr Ile Thr Gly Ala Gln Ala Glu Asp Glu Ala Asp
                1125            1130            1135

Tyr Tyr Cys Asn Ser Arg Asp Ser Ser Gly Asn His Val Val Phe Gly
            1140            1145            1150

Gly Gly Thr Lys Leu Thr Val Leu Ser Ser Ser Gly Leu Val Pro
        1155            1160            1165
```

```
Arg Gly Ser Ser Ser Ser Gly Ala Pro Thr Ser Ser Pro Ser Ser Val
        1170            1175            1180

Thr Arg Pro Trp Gln His Val Asp Ala Met Lys Glu Ala Leu Ser Leu
1185                1190            1195                    1200

Leu Asn Asn Ser Ser Glu Ile Thr Ala Val Met Asn Glu Thr Val Glu
                1205            1210                1215

Val Val Ser Glu Met Phe Asp Pro Glu Glu Pro Lys Cys Leu Gln Thr
                1220            1225            1230

His Leu Lys Leu Tyr Glu Gln Gly Leu Arg Gly Ser Leu Ile Ser Leu
            1235            1240                1245

Lys Glu Pro Leu Arg Met Met Ala Asn His Tyr Lys Gln His Cys Pro
        1250            1255            1260

Leu Thr Pro Glu Thr Pro Cys Glu Thr Gln Thr Ile Thr Phe Lys Asn
1265                1270            1275                    1280

Phe Lys Glu Lys Leu Lys Asp Phe Leu Phe Asn Asn Pro Phe Asp Cys
                1285            1290            1295

Trp Gly Pro Asp Gln Lys His His His His His His
            1300            1305
```